US010749919B2

(12) United States Patent
Yamagishi et al.

(10) Patent No.: US 10,749,919 B2
(45) Date of Patent: Aug. 18, 2020

(54) RECEPTION DEVICE, RECEPTION METHOD, TRANSMISSION DEVICE, AND TRANSMISSION METHOD FOR DISTRIBUTING SIGNALING INFORMATION

(71) Applicant: Saturn Licensing LLC, New York, NY (US)

(72) Inventors: Yasuaki Yamagishi, Kanagawa (JP); Naohisa Kitazato, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 268 days.

(21) Appl. No.: 15/318,372

(22) PCT Filed: Jun. 23, 2015

(86) PCT No.: PCT/JP2015/067946
§ 371 (c)(1),
(2) Date: Dec. 13, 2016

(87) PCT Pub. No.: WO2016/006431
PCT Pub. Date: Jan. 14, 2016

(65) Prior Publication Data
US 2017/0134764 A1    May 11, 2017

(30) Foreign Application Priority Data

Jul. 7, 2014  (JP) ................. 2014-139777

(51) Int. Cl.
*H04L 29/06* (2006.01)
*H04N 21/435* (2011.01)
(Continued)

(52) U.S. Cl.
CPC .......... *H04L 65/60* (2013.01); *H04L 65/1046* (2013.01); *H04L 65/4069* (2013.01);
(Continued)

(58) Field of Classification Search
CPC ... H04L 65/60; H04L 65/1046; H04L 65/608; H04L 67/02; H04L 65/4069;
(Continued)

(56) References Cited

U.S. PATENT DOCUMENTS 7,660,596 B1 * 2/2010 Euget .................. H04L 41/0896
455/509
8,230,073 B1 * 7/2012 Leeder ................ H04L 65/1046
370/230.1
(Continued)

FOREIGN PATENT DOCUMENTS

JP    2013-535057 A    9/2013
WO    WO 2006/054331 A1    5/2006

OTHER PUBLICATIONS

International Search Report dated Sep. 15, 2015, in PCT/JP2015/067946, filed Jun. 23, 2015.
(Continued)

*Primary Examiner* — Ramy M Osman
(74) *Attorney, Agent, or Firm* — Oblon, McClelland, Maier & Neustadt, L.L.P.

(57) ABSTRACT

There is provided a reception device including a signaling template acquisition unit for acquiring a LLS signaling template in order to generate LLS signaling information transmitted in LLS and a SCS signaling template in order to generate SCS signaling information transmitted in SCS, a differential information acquisition unit for acquiring LLS differential information applied to the LLS signaling template to generate the LLS signaling information, and SCS differential information applied to the SCS signaling template to generate the SCS signaling information, and a signaling information generation unit for applying the LLS differential information to the LLS signaling template thereby to generate the LLS signaling information, and
(Continued)

applying the SCS differential information to the SCS signaling template thereby to generate the SCS signaling information.

10 Claims, 32 Drawing Sheets

(51) Int. Cl.
    *H04L 29/08* (2006.01)
    *H04N 21/235* (2011.01)
    *H04N 21/2343* (2011.01)
    *H04N 21/643* (2011.01)
(52) U.S. Cl.
    CPC ............ *H04L 65/608* (2013.01); *H04L 67/02* (2013.01); *H04N 21/235* (2013.01); *H04N 21/23439* (2013.01); *H04N 21/435* (2013.01); *H04N 21/64322* (2013.01)
(58) Field of Classification Search
    CPC ....... H04N 21/23439; H04N 21/64322; H04N 21/435; H04N 21/235
    See application file for complete search history.

(56) References Cited

U.S. PATENT DOCUMENTS

| | | | | |
|---|---|---|---|---|
| 8,935,424 | B2* | 1/2015 | Bouazizi | H04L 65/4084 |
| | | | | 709/219 |
| 9,143,448 | B1* | 9/2015 | Kadosh | H04L 47/34 |
| 9,942,619 | B2* | 4/2018 | Yamagishi | H04N 21/6437 |
| 10,284,612 | B2* | 5/2019 | Zhang | H04L 65/4069 |
| 10,305,949 | B2* | 5/2019 | Kitahara | H04H 60/73 |
| 2003/0093526 | A1* | 5/2003 | Nandagopalan | H04L 65/1043 |
| | | | | 709/225 |
| 2005/0036449 | A1* | 2/2005 | Ranta-Aho | H04L 47/10 |
| | | | | 370/235 |
| 2010/0142915 | A1* | 6/2010 | McDermott | H04N 21/42646 |
| | | | | 386/343 |
| 2011/0307581 | A1 | 12/2011 | Furbeck et al. | |
| 2012/0042090 | A1* | 2/2012 | Chen | H04L 65/604 |
| | | | | 709/231 |
| 2012/0124179 | A1* | 5/2012 | Cappio | H04L 65/104 |
| | | | | 709/219 |
| 2012/0203867 | A1 | 8/2012 | Furbeck | |
| 2012/0207088 | A1* | 8/2012 | Liu | H04L 65/608 |
| | | | | 370/328 |
| 2012/0233345 | A1* | 9/2012 | Hannuksela | H04L 67/02 |
| | | | | 709/231 |
| 2012/0290644 | A1* | 11/2012 | Gabin | H04L 65/608 |
| | | | | 709/203 |
| 2012/0317303 | A1* | 12/2012 | Wang | H04L 65/4076 |
| | | | | 709/231 |
| 2013/0066891 | A1* | 3/2013 | Boldyrev | H04N 21/2353 |
| | | | | 707/755 |
| 2013/0212166 | A1* | 8/2013 | Willig | H04L 65/1016 |
| | | | | 709/203 |
| 2014/0047123 | A1* | 2/2014 | Oyman | H04L 65/4084 |
| | | | | 709/231 |
| 2014/0101118 | A1* | 4/2014 | Dhanapal | H04L 65/00 |
| | | | | 707/695 |
| 2014/0282792 | A1* | 9/2014 | Bao | H04N 21/44004 |
| | | | | 725/116 |
| 2014/0289371 | A1* | 9/2014 | Moore | H04L 65/608 |
| | | | | 709/219 |
| 2014/0298157 | A1* | 10/2014 | Lim | G06F 17/2247 |
| | | | | 715/234 |
| 2015/0089558 | A1* | 3/2015 | Shimizu | H04N 21/2402 |
| | | | | 725/96 |
| 2016/0057192 | A1* | 2/2016 | Delaunay | H04L 65/605 |
| | | | | 709/219 |
| 2017/0055006 | A1* | 2/2017 | Yamagishi | H04N 21/435 |
| 2017/0134764 | A1* | 5/2017 | Yamagishi | H04N 21/235 |
| 2019/0182086 | A1* | 6/2019 | Kwak | H04L 29/06 |

OTHER PUBLICATIONS

ISO/IEC 23009-1, "Information technology—Dynamic adaptive streaming over HTTP (DASH)", 2012, 134 pages.
Extended European Search Report dated Feb. 6, 2018 in European Patent Application No. 15818251.9, 7 pages.
Furbeck, D., "DASH MPD Delta Files", Research in Motion, XP030047072, Oct. 2, 2010, pp. 1-10.
Office Action dated Feb. 19, 2019 in Japanese Patent Application No. 2016-532854 (With English Translation).

* cited by examiner

FIG. 1

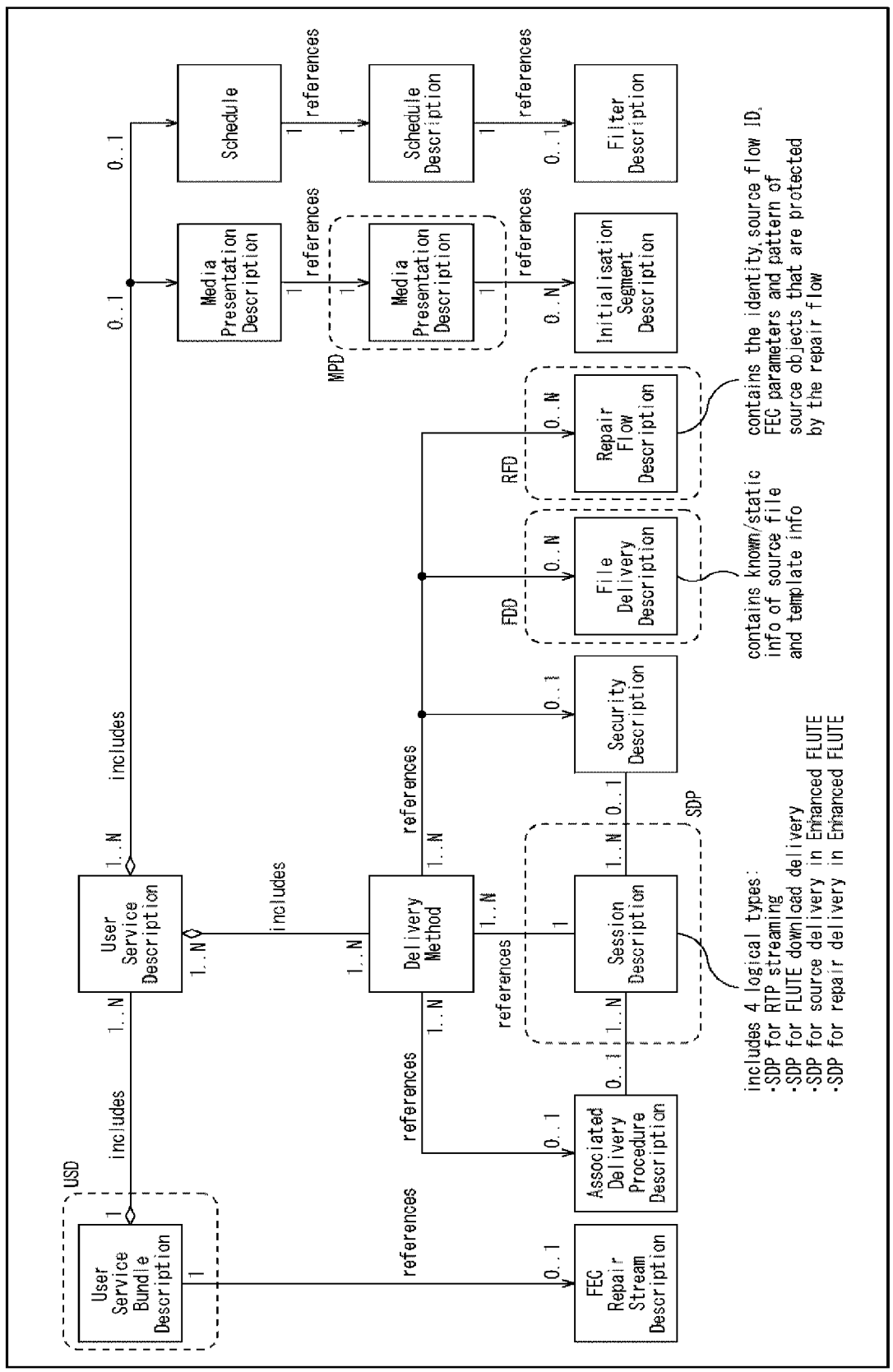

FIG. 3

```
<bundleDescription xsi:schemaLocation="" urn:3GPP:metadata:2005:MBMS:userServiceDescription
SonyModifiedUSD¥USD-sony-schema-main.xsd" xmlns="" urn:3GPP:metadata:2005:MBMS:userServiceDescription" xmlns:xsi="
http://www.w3.org/2001/XMLSchema-instance" xmlns:r9="" urn:3GPP:metadata:2009:MBMS:userServiceDescription" xmlns:r12="
urn:3GPP:metadata:2013:MBMS:userServiceDescription" xmlns:sv="" urn:3gpp:metadata:2009:MBMS:schemaVersion" xmlns.sony="
urn:SonyDefinedSuperSimplified:StaticFileDeliveryeDescription" >
  <userServiceDescription serviceId="" urn:atsc:serviceid:1234" >
    <deliveryMethod sessionDescriptionURI="" http://www.example.com/stsc3/sdp.sdp" sony.staticFDDUri="
http://www.example.com/stsc3/fdd1.fdd" >
      <sv:delimiter>0</sv:delimiter>
      <r12:broadcastAppService>
        <r12:basePattern>http://www.example.com/video/</r12:basePattern>
        <r12:basePattern>http://www.example.com/audio/</r12:basePattern>
      </r12:broadcastAppService>
      <r12:unicastAppService>
        <r12:basePattern>http://www.example.com/audio2/</r12:basePattern>
      </r12:unicastAppService>
      <sv:delimiter>0</sv:delimiter>
    </deliveryMethod>
    <r9:mediaPresentationDescription>
      <r9:mpdURI>http://www.example.com/mpd-h.mpd</r9:mpdURI>
    </r9:mediaPresentationDescription>
    <sv:delimiter>0</sv:delimiter>
    <sv:delimiter>0</sv:delimiter>
  </userServiceDescription>
  <sv:schemaVersion>2</sv:schemaVersion>
</bundleDescription>
```

FIG. 4

```
<staticFDD xmlns="" urn:SonyDefinedSuperSimplified:StaticFileDeliveryDescription" xmlns:xsi="http://www.w3.org/2001/XMLSchema-instance"
xsi:SchemaLocation=" urn:SonyDefinedSuperSimplified:StaticFileDeliveryDescription
SonyModifiedUSD¥USD-sony-schema-snippet.xsd" >
  <chunkedFile Content-Location=" http://example.com/video/1.mp4" >
    <FileTemplate startTOI=" 1" endTOI=" 4" >http://example.com/video/1.mp4.$TOI$</FileTemplate>
  </chunkedFile>
  <chunkedFile Content-Location=" http://example.com/audio/1.mp4" >
    <FileTemplate startTOI=" 1" endTOI=" 4" >http://example.com/video/1.mp4.$TOI$</FileTemplate>
  </chunkedFile>
</staticFDD>
```

```
v=0
o=user123 2890844526 2890842807 IN IP4 224.0.0.100
s=XYZ
t=2873397496 2873404696
a=FEC-declaration:0 encoding-id=1
a=flute-tsi:1
m=application 12345 FLUTE/UDP 0
c=IN IP4 224.0.0.100/1
```

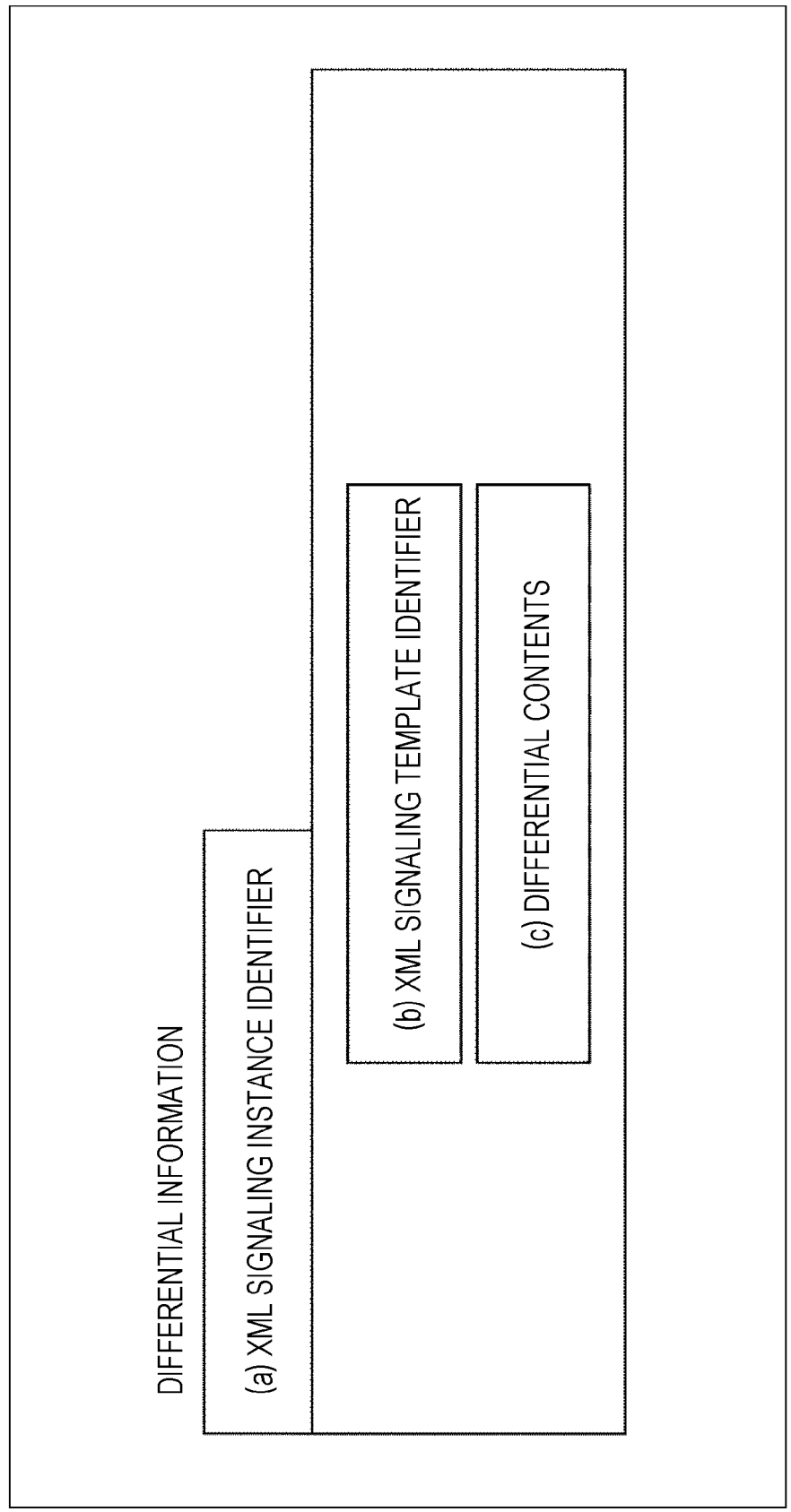

FIG. 10

```
<?xml version="1.0" encoding="UTF-8"?>
<metadataEnvelope xmlns="urn:3gpp:metadata:2005:MBMS:envelope" xmlns:xsi="http://www.w3.org/2001/XMLSchema-instance"
xsi:schemaLocation="urn:3gpp:metadata:2005:MBMS:envelope ¥xml-f.xsd">
<item metadataURI="http://www.example.com/stsc3/mpd-t.xml" version="1" validFrom="2005-12-15T09:30:47-05:00" validUntil="
2005-12-16T09:30:47-05:00" contentType="application/dash+xml"/>
<metadataFragment>
<![CDATA[
<MPD xmlns="urn:mpeg:DASH:schema:MPD:2011" type="dynamic" minimumUpdatePeriod="PT10S" timeShiftBufferDepth="PT600S"
minBufferTime="PT2S" profiles="urn:atsc:profile:live:2015"
xmlns:xsi="http://www.w3.org/2001/XMLSchema-instance" xsi:schemaLocation="urn:mpeg:DASH:schema:MPD:2011
..¥MPDSchema¥DASH-MPD.xsd">
<BaseURL>http://example.com/</BaseURL>
<Period id="1" start="PT0S" >
    <AdaptationSet mimeType="video/mp4" >
    <BaseURL>video/</BaseURL>
    <SegmentTemplate duration="2" startNumber="1" media="$Number$.mp4" initialization="init_v.mp4" />
    <Representation id="v1" codecs="avc1.4d401f" width="1280" height="720" bandwidth="3000000" />
    </AdaptationSet>
    <AdaptationSet mimeType="audio/mp4" codecs="mp4a.40.5" lang="en" >
    <BaseURL>audio/</BaseURL>
    <SegmentTemplate duration="2" startNumber="1" media="$Number$.mp4" initialization="init_a.mp4" />
    <Representation id="a0" bandwidth="128000" />
    </AdaptationSet>
</Period>
</MPD>
]]>
</metadataFragment>
</item>
</metadataEnvelope>
```

(a) XML SIGNALING TEMPLATE IDENTIFIER (b,c) XML SIGNALING TEMPLATE
(b) XML ELEMENT/ATTRIBUTE WITHOUT DYNAMIC CHANGE OF CONTENT
(c) XML ELEMENT/ATTRIBUTE WITH DYNAMIC CHANGE OF CONTENT

FIG. 12

```
<?xml version="1.0" encoding="UTF-8"?>
<metadataEnvelope xmlns="urn:3gpp:metadata:2005:MBMS:envelope" xmlns:xsi="http://www.w3.org/2001/XMLSchema-instance"
 xsi:schemaLocation="urn:3gpp:metadata:2005:MBMS:envelope ..¥xml-f.xsd">
 <item metadataURI="http://www.example.com/atsc3/e-mpd-b.mpd" version="1" validFrom="2005-12-15T09:30:47-05:00" validUntil="
 2005-12-16T09:30:47-05:00" contentType="application/dash+xml"/>
 <metadataFragment>
 <![CDATA[
<MPD xmlns="urn:mpeg:DASH:schema:MPD:2011" type="dynamic" minimumUpdatePeriod="PT10S" timeShiftBufferDepth="PT600S"
 minBufferTime="PT2S" profiles="urn:atsc:profile:live:2015" availabilityStartTime="2014-03-03T08:00:00Z"
 xmlns:xsi="http://www.w3.org/2001/XMLSchema-instance" xsi:schemaLocation="urn:mpeg:DASH:schema:MPD:2011
 ..¥MPDSchema¥DASH-MPD.xsd">
 <BaseURL>http://example.com/</BaseURL>
 <Period id="1" start="PT0S" >
   <AdaptationSet mimeType="video/mp4" >
     <BaseURL>video/</BaseURL>
     <SegmentTemplate duration="2" startNumber="1" media="$Number$.mp4" initialization="init_v.mp4" />
     <Representation id="v1" codecs="avc1.4d401f" width="1280" height="720" bandwidth="3000000" />
   </AdaptationSet>
   <AdaptationSet mimeType="audio/mp4" codecs="mp4a.40.5" lang="en" >
     <BaseURL>audio/</BaseURL>
     <SegmentTemplate duration="2" startNumber="2" media="$Number$.mp4" initialization="init_a.mp4" />
     <Representation id="a0" bandwidth="128000" />
   </AdaptationSet>
 </Period>
</MPD>
]]>
 </metadataFragment>
 </item>
</metadataEnvelope>
```

(a) XML SIGNALING INSTANCE IDENTIFIER (b2) CHANGED (ADDED) PART BASED ON DIFFERENTIAL INFORMATION (b) XML SIGNALING INSTANCE
(b1) XML ELEMENT/ATTRIBUTE WITHOUT DYNAMIC CHANGE OF CONTENT (TEMPLATE APPLIED)
(b2) XML ELEMENT/ATTRIBUTE WITH DYNAMIC CHANGE OF CONTENT (CHANGED ON THE BASIS OF DIFFERENTIAL INFORMATION)

FIG. 23

| Element/Attribute(with@) | Card. | Description |
|---|---|---|
| Service Content Description | 1 | Service configuration table |
| @majorProtocolversion | 0..1 | major Protocol Version   default="1! |
| @minorProtocolversion | 0..1 | minor Protocol Version   default="0! |
| @RFchannelId | 1 | RF channel ID |
| @name | 0..1 | Broadcaster name for each Physical channel |
| Tuning RF | 0..n | |
|    @frequency | 1 | Center frequency of this RF channel |
|    Preamble | 0..1 | Preamble data |
| LLSSignalingtemplate | 0..n | LLS SIGNALING TEMPLATE STORAGE ELEMENT (SIGNALING TEMPLATE ITSELF CAN BE STORED IN CONTENTS.) |
|    @uri | 0..1 | SIGNALING TEMPLATE URI (STORE URI FOR IDENTIFYING DIFFERENT FRAGMENT TRANSFERRED IN SAME SESSION OR URI ON ACQUISITION VIA BROADBAND.) |
| SCSSignalingtemplate | 0..n | SCS SIGNALING TEMPLATE STORAGE ELEMENT |
|    @uri | 0..1 | SIGNALING TEMPLATE URI (STORE URI FOR IDENTIFYING DIFFERENT FRAGMENT TRANSFERRED IN SAME SESSION OR URI ON ACQUISITION VIA BROADBAND.) |
| BBPStream | 1..n | BBP stream |
|    @bbpStreamId | 1 | BBP stream ID |
|    @payloadType | 1 | BBP payload type "ipv4","ipv6","ts" |
|    @name | 0..1 | BBP stream name |
|    ESGBootstrap | 0..1 | Access information for ESG |
|       ESGProvider | 1..n | ESG provider |
|          @providerName | 0..1 | ESG provider name |
|          ESGBroadbandLocation | 0..1 | ESG location from broadband |
|             @ESGurl | 1 | URL for ESG files |
|    ClockReferenceInformation | 0..1 | Clock Reference related information |
|       @sourceIPAddress | 1 | Source IP address for Clock reference transmission |
|       @destinationIPAddress | 1 | Destination IP address for Clock reference transmission |
|       @portNum | 1 | UDP port number for Clock reference transmission |
|    Service | 1..n | Service |
|       @serviceId | 1 | Service ID |
|       @serviceType | 1 | Service type "continuoud","scripted" |
|       @hidden | 0..1 | Hidden service or not "on","off" |
|       @hiddenGuide | 0..1 | Hidden service on ESG "on","off" |
|       @shortName | 1 | Short service name  ≤7 character |
|       @longName | 0..1 | Long service name |
|       @accesControl | 0..1 | Access controlled service or not "on","off" |
|       Sourceorigin | 0..1 | Original service as source |
|          @country | 1 | Country code |
|          @originalRFChannelId | 1 | Original RF channel ID |
|          @bbpStreamId | 1 | BBP stream ID |
|          @serviceId | 1 | Service ID |
|       SCBbootstrap | 1 | Access information for service channel |
|          @sourceIPAddress | 1 | Source IP address to transmit service |
|          @destinationIPAddress | 1 | Destination IP address to transmit service |
|          @portNum | 1 | Port number to transmit SCS |
|          @tsi | 1 | FLUTE Session TSI to transmit SCS |
|       AssociatedService | 0..n | Associated service |
|          @RFChannelId | 0..1 | RF channel ID |
|          @bbpStreamId | 0..1 | BBP stream ID |
|          @serviceId | 1 | Service ID |

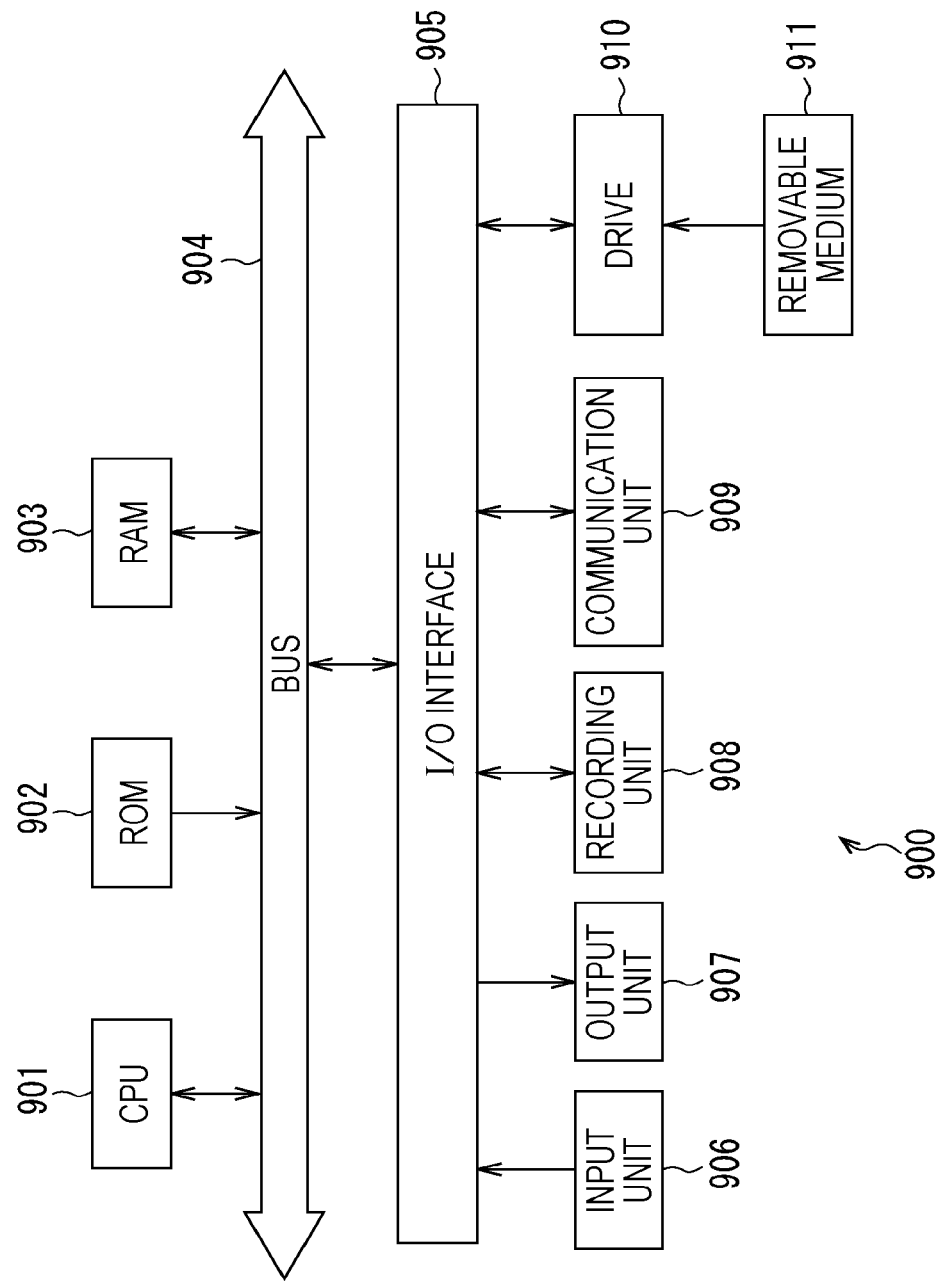

RECEPTION DEVICE, RECEPTION METHOD, TRANSMISSION DEVICE, AND TRANSMISSION METHOD FOR DISTRIBUTING SIGNALING INFORMATION

TECHNICAL FIELD

The present technology relates to a reception device, a reception method, a transmission device, and a transmission method, and particularly to a reception device, a reception method, a transmission device, and a transmission method for enabling signaling information required for a content reception/reproduction processing to be efficiently distributed.

BACKGROUND ART

In recent years, a mainstream distribution system of streaming services provided via the Internet is over the top (OTT). OTT is a content distribution system enabling contents configured of videos or audios to be distributed irrespective of a service form of each communication carrier. Contents distributed by use of OTT are denoted as over the top video (OTT-V).

Further, dynamic adaptive streaming over HTTP (DASH) has been widely used as a basic technology of OTT-V. DASH is a standard of adaptive streaming using hypertext transfer protocol (HTTP)-based streaming protocol (see Non-Patent Document 1, for example).

In the adaptive streaming, a distribution server generates a manifest file describing therein stream data per bit rates and its attribute information or uniform resource locator (URL) and provides it to a client device in order to enable contents to be reproduced in the client device as content distribution destination. The client device can acquire the manifest file from the distribution server, and adaptively select and reproduce stream data at an optimum bit rate depending on an available transmission bandwidth, for example.

CITATION LIST

Non-Patent Document

Non-Patent Document 1: ISO/IEC 23009-1: 2012 Information technology Dynamic adaptive streaming over HTTP (DASH)

SUMMARY OF THE INVENTION

Problems to be Solved by the Invention

Incidentally, the moving picture experts group phase 2-transport stream (MPEG2-TS) system is employed as transmission system in a digital broadcasting standard in each country, and in the future, it is assumed that an Internet protocol (IP) transmission system using IP packets used in the field of communication for digital broadcasting is introduced to provide more advanced services.

In introduction of the IP transmission system, it is assumed that control information such as media presentation description (MPD) employed for DASH is used as signaling information required for a content reception/reproduction processing. The signaling information is described in the text format such as extensible markup language (XML) document, and is distributed from a distribution server such as communication server or broadcast server to a client device.

Further, the signaling information is frequently and repeatedly distributed at any timing of $\frac{1}{100}$ milliseconds, for example, assuming the presence of a client device starting to receive contents. In this way, the signaling information is repeatedly distributed at a short interval so that the client device can receive the signaling information as needed and perform a processing required for receiving and reproducing contents without any delay on the basis of the signaling information.

With the repeated distribution of the signaling information, however, a processing load on the distribution server can increase, which leads to a compressed transmission bandwidth. Further, since the signaling information is described in the text format, its data size is large, which is a cause of the compressed transmission bandwidth. Thus, there has been desired a technology for efficiently distributing signaling information required for a content reception/reproduction processing.

The present technology has been made in terms of the situation, and is directed for efficiently distributing signaling information required for a content reception/reproduction processing.

Solutions to Problems

A reception device according to a first aspect of the present technology includes: a signaling template acquisition unit for acquiring a first signaling template in order to generate first signaling information transmitted in a first hierarchy lower than an Internet protocol (IP) layer in the protocol hierarchies in an IP transmission system, and a second signaling template in order to generate second signaling information transmitted in a second hierarchy higher than the IP layer; a differential information acquisition unit for acquiring first differential information applied to the first signaling template to generate the first signaling information, and second differential information applied to the second signaling template to generate the second signaling information; and a signaling information generation unit for applying the first differential information to the first signaling template thereby to generate the first signaling information, and applying the second differential information to the second signaling template thereby to generate the second signaling information.

The first signaling template, the second signaling template, and the first differential information may be transmitted in the first hierarchy, the second differential information may be transmitted in the second hierarchy, the signaling template acquisition unit may acquire the first signaling template and the second signaling template transmitted in the first hierarchy, and the differential information acquisition unit may acquire the first differential information transmitted in the first hierarchy and the second differential information transmitted in the second hierarchy.

The first signaling information may include a parameter not depending on a service identified by an IP address, and the second signaling information may include a parameter depending on the service.

The differential information acquisition unit may acquire third differential information applied to the second signaling template to generate the service-based second signaling template, which is transmitted in the second hierarchy, and the service-based second signaling template may be generated by applying the third differential information to the second signaling template.

The first signaling template and the second signaling template may be stored in the first signaling information.

The information on reference destinations of the first signaling template and the second signaling template may be stored in the first signaling information.

A recording unit for recording the first signaling template and the second signaling template therein may be further included.

The reception device may be an independent device, or an internal block configuring one apparatus.

A reception method according to the first aspect of the present technology is a reception method for the reception device according to the first aspect of the present technology described above.

With the reception device and the reception method according to the first aspect of the present technology, a first signaling template for generating first signaling information transmitted in a first hierarchy lower than an IP layer in the protocol hierarchies in an IP transmission system, and a second signaling template for generating second signaling information transmitted in a second hierarchy higher than the IP layer are acquired, first differential information applied to the first signaling template to generate the first signaling information and second differential information applied to the second signaling template to generate the second signaling information are acquired, the first differential information is applied to the first signaling template thereby to generate the first signaling information, and the second differential information is applied to the second signaling template thereby to generate the second signaling information.

A transmission device according to a second aspect of the present technology includes: a signaling template generation unit for generating a first signaling template in order to generate first signaling information transmitted in a first hierarchy lower than an IP layer in the protocol hierarchies in an IP transmission system, and a second signaling template in order to generate second signaling information transmitted in a second hierarchy higher than the IP layer; a differential information generation unit for generating first differential information applied to the first signaling template to generate the first signaling information, and second differential information applied to the second signaling template to generate the second signaling information; and a transmission unit for transmitting the first signaling template, the second signaling template, the first differential information, or the second differential information.

The first signaling template, the second signaling template, and the first differential information may be transmitted in the first hierarchy, and the second differential information may be transmitted in the second hierarchy.

The first signaling information may include a parameter not depending on a service identified by an IP address, and the second signaling information may include a parameter depending on the service.

The differential information generation unit may generate third differential information applied to the second signaling template to generate the service-based second signaling template, and the transmission unit may transmit the third differential information in the second hierarchy.

The first signaling template and the second signaling template may be stored in the first signaling information.

Information on reference destinations of the first signaling template and the second signaling template may be stored in the first signaling information.

The transmission device may be an independent device, or an internal block configuring one apparatus.

A transmission method according to the second aspect of the present technology is a transmission method for the transmission device according to the second aspect of the present technology described above.

With the transmission device and the transmission method according to the second aspect of the present technology, a first signaling template for generating first signaling information transmitted in a first hierarchy lower than an IP layer in the protocol hierarchies in an IP transmission system and a second signaling template for generating second signaling information transmitted in a second hierarchy higher than the IP layer are generated, first differential information applied to the first signaling template to generate the first signaling information and second differential information applied to the second signaling template to generate the second signaling information are generated, and the first signaling template, the second signaling template, the first differential information, or the second differential information is transmitted.

Effects of the Invention

According to the first aspect and the second aspect of the present technology, it is possible to efficiently distribute signaling information required for a content reception/reproduction processing.

The effects described herein are not necessarily limited, and any of the effects described in the present disclosure may be obtained.

BRIEF DESCRIPTION OF DRAWINGS

FIG. 1 is a diagram illustrating a protocol stack of 3GPP-MBMS.

FIG. 2 is a diagram illustrating a metadata configuration of USD.

FIG. 3 is a diagram illustrating exemplary description of USD.

FIG. 4 is a diagram illustrating exemplary description of FDD.

FIG. 9 is a diagram illustrating a configuration of differential information.

FIG. 10 is a diagram illustrating exemplary description of the XML signaling template.

FIG. 12 is a diagram illustrating exemplary description of the XML signaling instance.

FIG. 23 is a diagram illustrating an exemplary syntax of SCD storing the LLS/SCS signaling templates therein.

FIG. 33 is a diagram illustrating an exemplary configuration of a computer.

MODE FOR CARRYING OUT THE INVENTION

Figure 5:
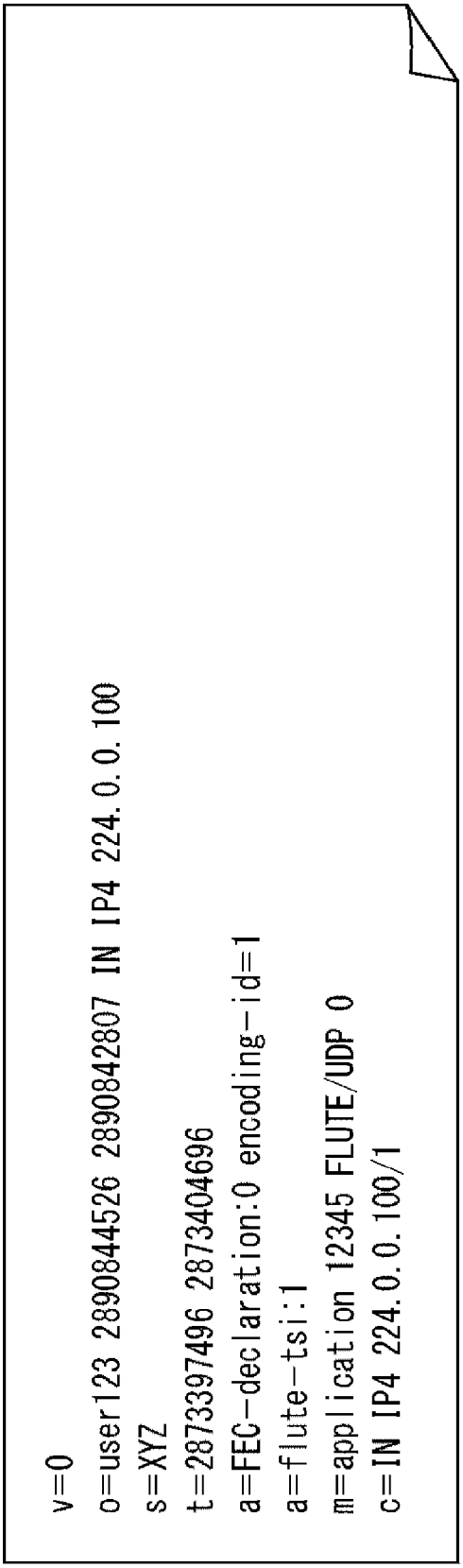
FIG. 5 is a diagram illustrating exemplary description of SPD.

An exemplary embodiment of the present technology will be described below with reference to the drawings. The description will be made in the following order.

1. Signaling information distribution using XML signaling template
2. Signaling information distribution using LLS/SCS signaling templates
3. Configuration of system
4. Flow of processing in each device
5. Configuration of computer <1. Signaling Information Distribution Using XML Signaling Template>

(3GPP-MBMS (eMBMS))

Third generation partnership project (3GPP) as international standardization organization proposes a system for reducing loads on communication resources by use of both point-to-point (P2P) communication and multicast/broadcast (MC/BC) bearer when contents are simultaneously distributed according to the dynamic adaptive streaming over HTTP (DASH) standard.

The simultaneous distribution service according to the DASH standard is called multimedia broadcast and multicast service (MBMS). As a system for efficiently realizing MBMS in long term evolution (LTE), evolved multimedia broadcast multicast service (eMBMS) is proposed. MBMS and eMBMS are a simultaneous distribution service and are a service for simultaneously distributing the same contents by a common bearer to a plurality of client devices positioned within a specific area. Additionally, in the following description, when MBMS and eMBMS do not particularly need to be discriminated from each other, they are denoted as MBMS for description.

Figure 1:
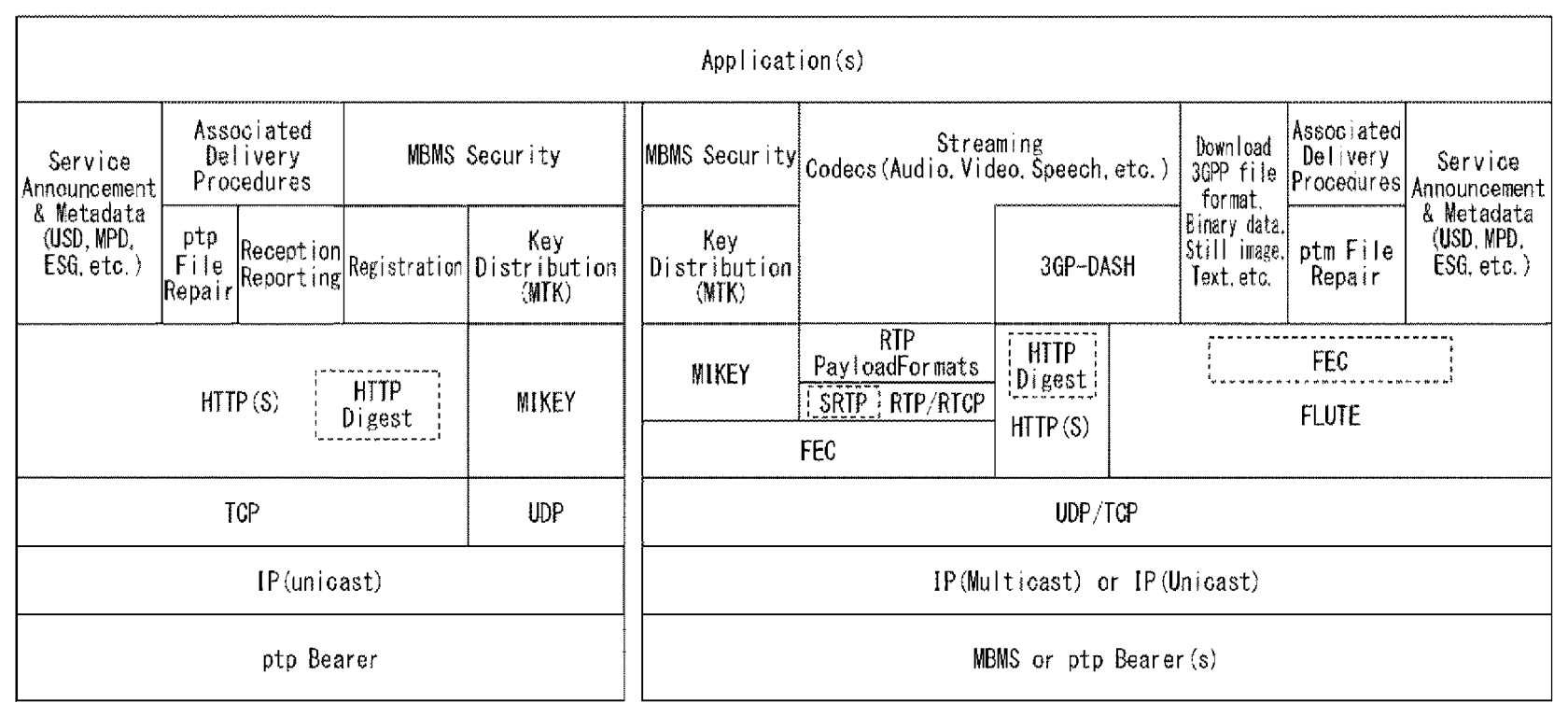

FIG. 1 is a diagram illustrating a protocol stack of 3GPP-MBMS.

In FIG. 1, the lowest hierarchy is assumed as physical layer. In 3GPP-MBMS, for transmission using the broadcasting on the right side in the figure, the physical layer uses either unidirectional MBMS or bidirectional ptp Bearer (s).

A hierarchy adjacently higher than the physical layer is assumed as IPlayer. Further, a hierarchy adjacently higher than the IP layer is assumed as UDP/TCP layer. That is, when MBMS is used as physical layer, IP multicast is used in the IP layer, and user data gram protocol (UDP) is used in the UDP/TCP layer. On the other hand, when ptp Bearer(s) is used as physical layer, IP unicast is used in the IP layer, and transmission control protocol (TCP) is used in the UDP/TCP layer.

A hierarchy adjacently higher than the UDP/TCP layer is assumed as FEC, HTTP(S), and FLUTE. File delivery over unidirectional transport (FLUTE) is a file transfer protocol in multicast. Forward error correction (FEC) is applied to FLUTE.

A hierarchy adjacently higher than FLUTE is assumed as 3GP-DASH, Download 3GPP file format etc, ptm File Repair, and Service Announcement & Metadata. Further, a hierarchy adjacently higher than ptm File Repair is assumed as Associated Delivery Procedures.

A hierarchy adjacently higher than 3GP-dynamic adaptive streaming over HTTP (DASH) is assumed as stream data of audio or video. That is, the stream data of audio or video configuring contents can be transmitted in the FLUTE session in units of media segment conforming to ISO base media file format (BMFF) standard.

Further, signaling information such as user service description (USD) or media presentation description (MPD) can be arranged as control information for the stream data transmitted in the FLUTE session in Service Announcement & Metadata. Therefore, the signaling information such as USD or MPD can be transmitted in the FLUTE session.

In this way, a file download protocol is defined in the file FLUTE session based on a 3GPP file format (ISO BMFF file or MP4 file) in 3GPP-MBMS, and a fragmented MP4 file sequence in DASH, and MPD conforming to the DASH standard can be transmitted in the same protocol. Additionally, MPD is referred to by USD similarly transmitted in the FLUTE session. Further, fragmented MP4 indicates a fragmented MP4 file.

Additionally, a hierarchy higher than HTTP(S) which is adjacently higher than the UDP/TCP layer is assumed as 3GP-DASH stream data. That is, 3GP-DASH stream data can be transmitted by use of HTTP(S). Further, a hierarchy higher than FEC which is adjacently higher than the UDP/TCP layer is assumed as RTP/RTCP and MIKEY. A hierarchy higher than RTP/RTCP is assumed as RTP PayloadFormats, and a hierarchy higher than it is assumed as stream data. That is, stream data can be transmitted in a real time transport protocol (RTP) session. A hierarchy higher than MIKEY is assumed as Key Distribution (MTK), and a hierarchy higher than it is assumed as MBMS Security.

On the other hand, in transmission using the cell phone communication network on the left side in the figure, the physical layer uses only bidirectional ptp Bearer. A hierarchy adjacently higher than the physical layer is assumed as IP layer. Further, a hierarchy adjacently higher than the IP layer is assumed as TCP layer, and a hierarchy adjacently higher than the TCP layer is assumed as HTTP(S) layer. That is, the protocol stack operating in a network such as the Internet is mounted by the hierarchies.

A hierarchy adjacently higher than the HTTP(S) layer is assumed as Service Announcement & Metadata, ptm File Repair, Reception Reporting, and Registration. Signaling information such as USD or MPD can be arranged as control information for the stream data transmitted in the FLUTE session using broadcasting in Service Announcement & Metadata. Thus, the signaling information such as USD or MPD can be provided by a communication server on the Internet.

Additionally, a hierarchy adjacently higher than ptm File Repair and Reception Reporting is assumed as Associated Delivery Procedures. Further, a hierarchy adjacently higher than Registration is assumed as MBMS Security. Further, a hierarchy higher than the UDP layer which is adjacently higher than the IP layer is assumed as MIKEY. A hierarchy higher than MIKEY is assumed as Key Distribution (MTK), and a hierarchy higher than it is assumed as MBMS Security. Further, an application(s) can be transmitted by use of the FLUTE session using broadcasting or the TCP/IP protocol using the cell phone communication network, for example.

(Metadata Configuration of USD)

FIG. 2 is a diagram illustrating a metadata configuration of USD. Additionally, FIG. 3 illustrates exemplary description of USD, where USD is described as extensible markup language (XML) document.

In FIG. 2, under user service bundle description (USBD) element corresponding to USD in FIG. 1 or the like, a user service description (USD) element is arranged per service. Further, the USBD element can refer to FEC Repair Stream Description.

Under the USD element, DeliveryMethod element, Media Presentation Description element, and Schedule element are arranged. The DeliveryMethod element can refer to Associated Delivery Procedure Description, session description protocol (SDP), Security Description, file delivery description (FDD), and repair flow description (RFD). Further, SDP is associated with Associated Delivery Procedure Description and Security Description.

Additionally, FIG. 4 illustrates exemplary description of FDD, where FDD is described as XML document. Further, FIG. 5 illustrates exemplary description of SDP, where SDP is described in character string in the text format. Further, though not illustrated, RFD is described as XML document.

The Media Presentation Description element can refer to media presentation description (MPD). Further, MPD can refer to Initialisation Segment Description. Additionally, MPD is described as XML document. The Schedule element can refer to ScheduleDescription. Further, ScheduleDescription can refer to Filter Description.

USD is configured as described above, and functions as reference information for SDP, FDD, RFD, and MPD, but signaling information such as USD, SDP, FDD, RFD, and MPD is described in the text format such as XML document. Such data in the text format is generally larger in data size when encoded than data in the binary format. Thus, when signaling information in the text format such as USD is generated and its encoded data is repeatedly distributed, a processing load on the distribution server increases and a larger bandwidth is consumed also in a distribution route.

In this way, when signaling information in the text format is distributed as encoded data, it is worse in distribution efficiency than encoded data in the binary format, while when signaling information is in the binary format, the signaling information in the binary format needs to be converted into the signaling information in the text format in the client device.

In this case, the client device does not necessarily have such a conversion processing function, and even if it has a conversion processing function, a load is imposed on the conversion processing. Then, if a time required for the conversion processing increases, a time to start receiving stream data of contents is delayed, and consequently a time to start reproducing the contents is also delayed.

Additionally, in a system proposed for 3GPP or the like, signaling information for which an analysis processing is requested in the application layer tends to be based on data in the text format such as XML document in terms of readability or extensibility. Therefore, the fact that signaling information in the binary format is distributed from a distribution server and is forced to be converted from the binary format to the text format in the client device does not match with the trend of the time.

For the above reasons, according to the present technology, continuously-available information among signaling information in the text format is first distributed as template, and then differential information applied to the template to generate the signaling information is distributed so that the differential information is applied to the template thereby to generate the signaling information in the client device. Thereby, the differential information is smaller in data size than the signaling information, and thus even the signaling information in the text format can be efficiently distributed.

(Outline of Signaling Information Distribution Using XML Signaling Template)

Figure 6:
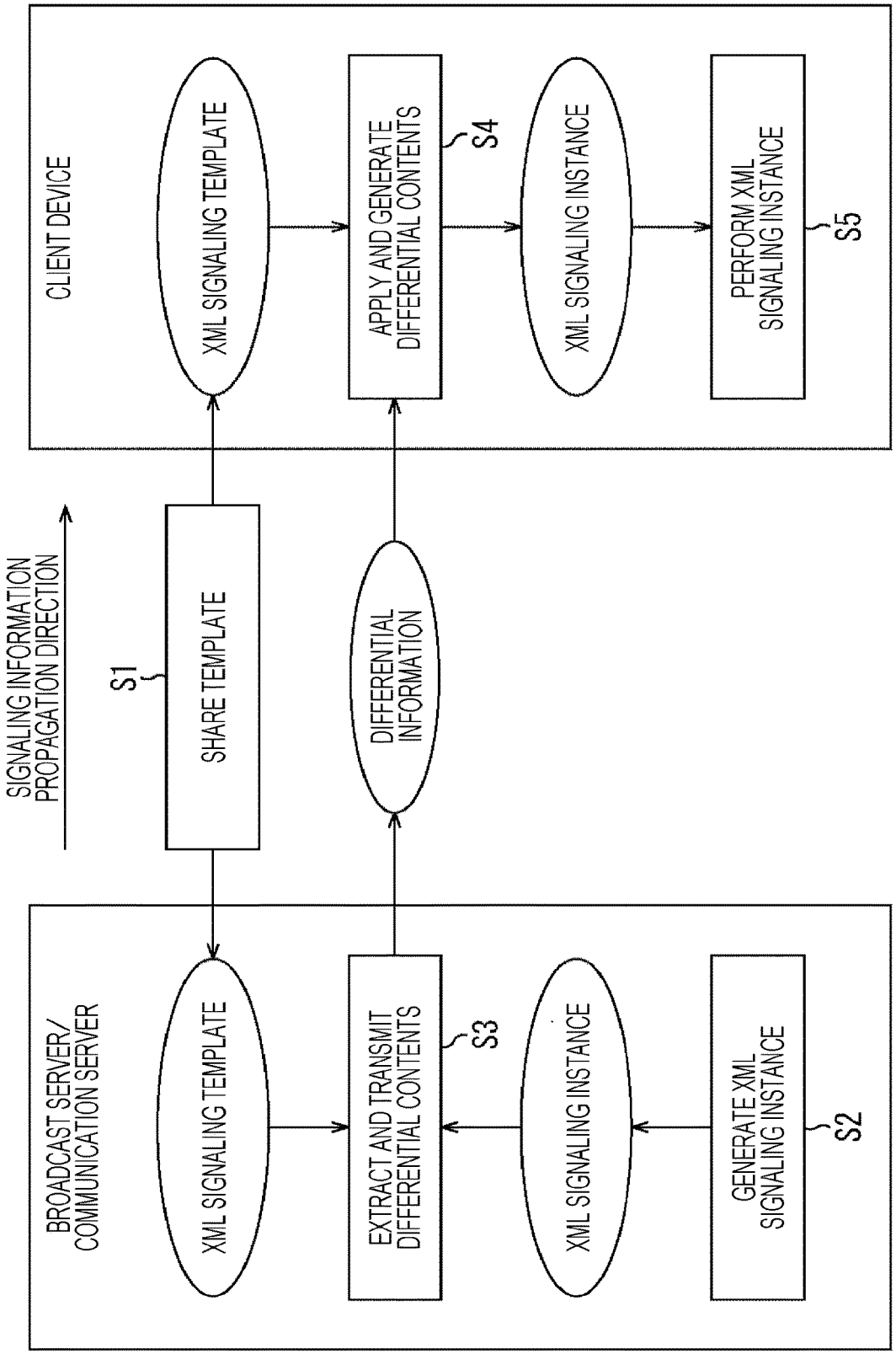
FIG. 6 is a diagram for explaining an outline of signaling information distribution using an XML signaling template.

FIG. 6 is a diagram for explaining an outline of signaling information distribution using an XML signaling template. In FIG. 6, a broadcast server or communication server as distribution server distributes signaling information to a client device from the left side to the right side in the figure.

At first, a template (which will be denoted as "XML signaling template" below), which is continuously available as information commonly used in a plurality of services of a plurality of contents, is shared between the distribution server and the client device (S1). Herein, the XML signaling template is provided by the distribution server of a broadcast station, for example, and is data in the XML format configured of information (such as control information) common in contents (services) such as various programs provided by the broadcast station.

Thereafter, the distribution server generates signaling information in the XML format (which will be denoted as "XML signaling instance" below) required for a processing of receiving/reproducing contents provided to the client device (S2). Herein, the XML signaling instance is generated as signaling information to be actually used during content reception/reproduction. The distribution server then extracts differential information between the XML signaling template shared in the processing in step S1 and the XML signaling instance generated in the processing in step S2, and distributes it to the client device (S3).

The client device applies the differential information distributed from the distribution server to the XML signaling template shared in the processing in step S1 thereby to generate the XML signaling instance to be actually available (S4). The client device then performs the content reception/reproduction processing on the basis of the XML signaling instance (signaling information) generated in the processing in step S4.

A specific configuration of the signaling information using the XML signaling template, which is distributed from the distribution server to the client device, will be described below.

(Configuration of XML Signaling Template)

Figure 7:
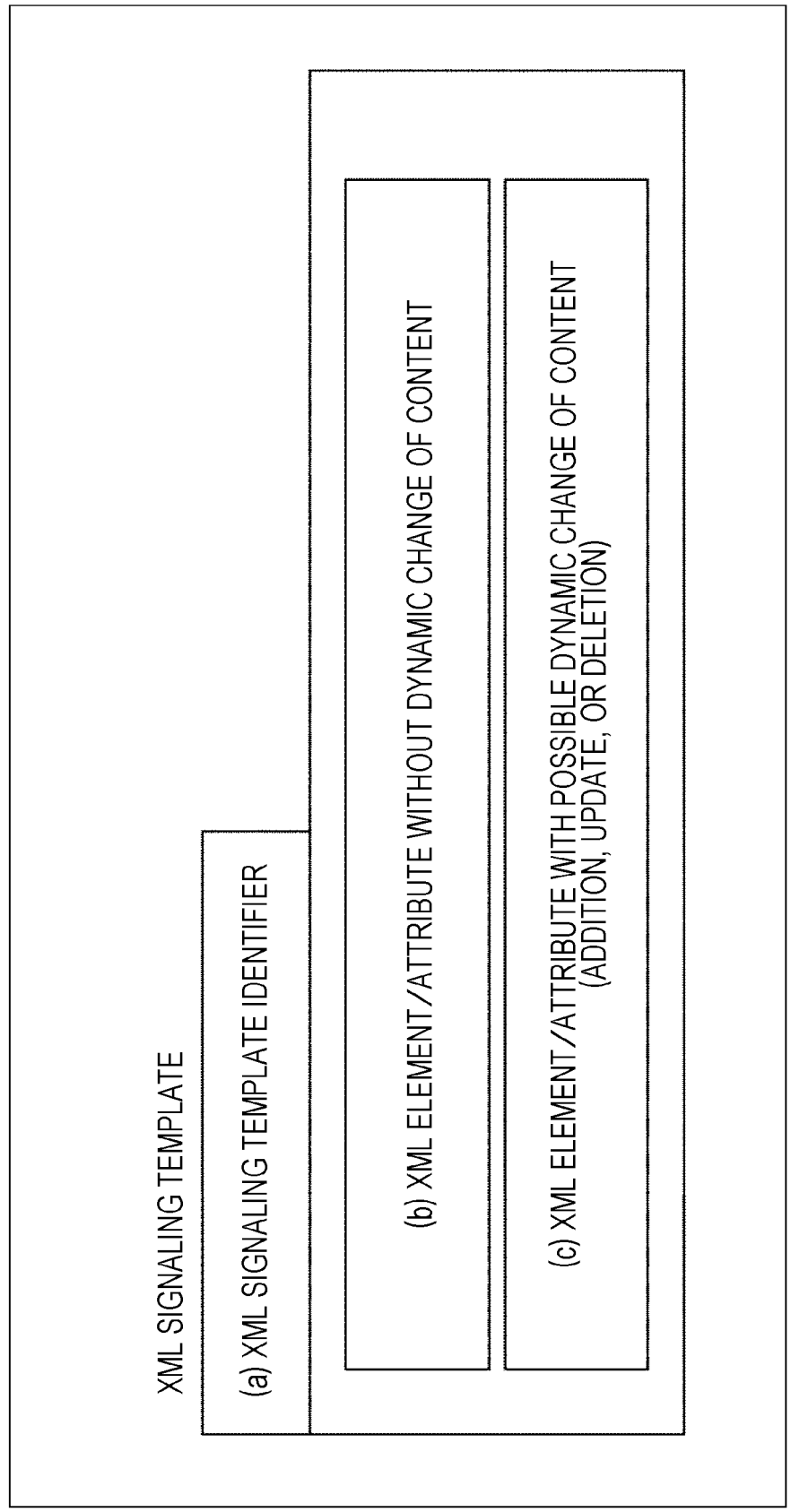
FIG. 7 is a diagram illustrating a configuration of the XML signaling template.

FIG. 7 is a diagram illustrating a configuration of the XML signaling template shared between the distribution server and the client device in the processing in step S1 of FIG. 6.

In FIG. 7, the XML signaling template includes (b) XML element/attribute without dynamic change of content and (c) XML element/attribute with possible dynamic change of content which are identified by (a) XML signaling template identifier. Additionally, (a) XML signaling template identifier can include version information.

(b) XML element/attribute without dynamic change of content is information commonly used in a plurality of contents in the content reception/reproduction processing in the client device, for example, and is configured of element information and attribute information of data in the XML format common in a plurality of XML signaling instances corresponding to the contents.

(c) XML element/attribute with possible dynamic change of content is configured of element information and attribute information of data in the XML format specific to an XML signaling instance corresponding to a specific content in the content reception/reproduction processing in the client device, for example. Dynamic change of content indicates addition, update, or deletion of content.

(Configuration of XML Signaling Instance)

Figure 8:
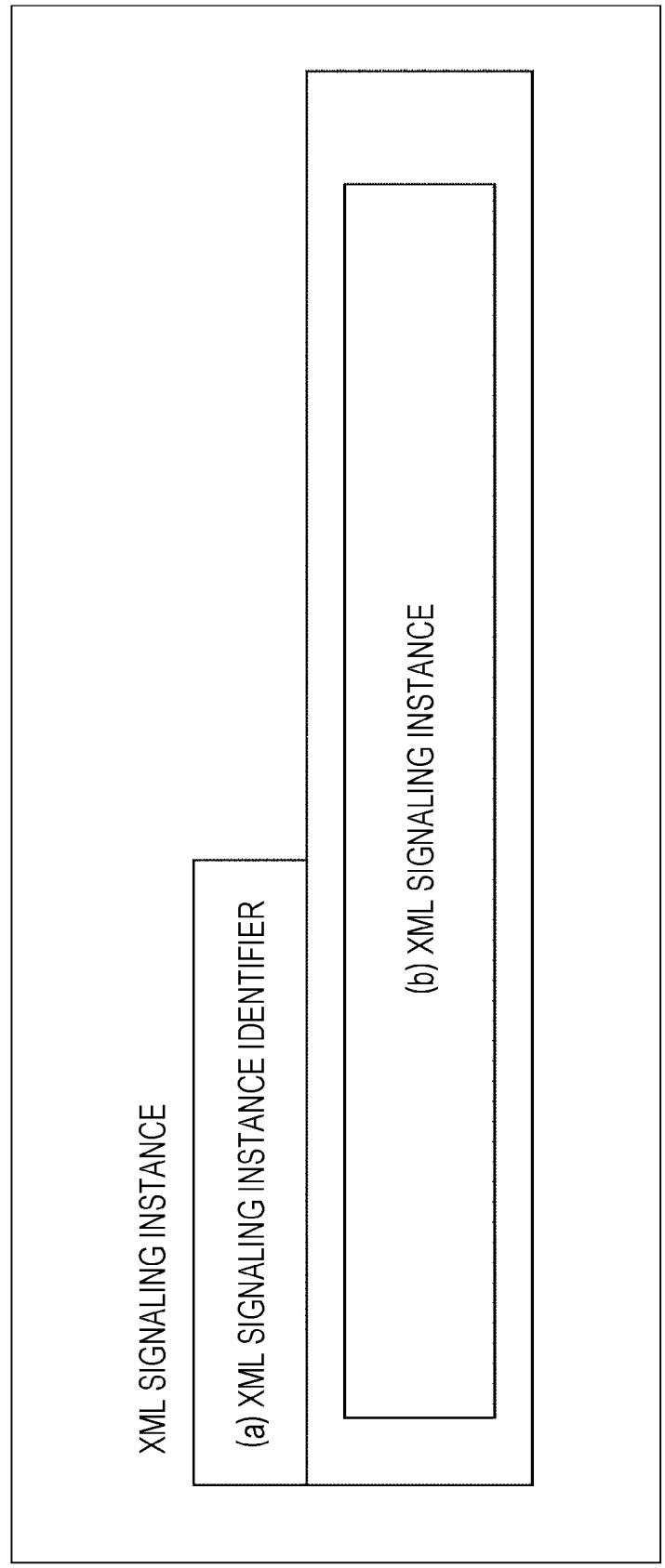
FIG. 8 is a diagram illustrating a configuration of an XML signaling instance.

FIG. 8 is a diagram illustrating a configuration of the XML signaling instance generated by the distribution server in the processing in step S2 of FIG. 6. Additionally, the configuration of the XML signaling instance of FIG. 8 may indicate the configuration of the XML signaling instance generated by the client device in the processing in step S4 of FIG. 6.

In FIG. 8, the XML signaling instance includes (b) XML signaling instance identified by (a) XML signaling instance identifier. Additionally, (a) XML signaling instance identifier can include version information.

(b) XML signaling instance is data in the XML format including control information or the like required for the processing of receiving/reproducing a specific content in the content reception/reproduction processing in the client device.

(Configuration of Differential Information)

FIG. 9 is a diagram illustrating a configuration of the differential information distributed by the distribution server in the processing in step S3 of FIG. 6. Additionally, the differential information of FIG. 9 may indicate the configuration of the differential information received by the client device in the processing in step S4 of FIG. 6.

In FIG. 9, the differential information includes (b) XML signaling template identifier and (c) differential contents which are identified by (a) XML signaling instance identifier. Additionally, (a) XML signaling instance identifier can include version information.

(b) XML signaling template identifier is information for uniquely identifying the XML signaling template. Additionally, the XML signaling template identifier can include version information.

(c) Differential contents are information on a difference between the XML signaling template and the XML signaling instance, and include dynamically-applied information. Further, the differential contents include application form information on an application form of any of addition, change and deletion of information for the XML signaling template.

Exemplary description of the signaling information using the XML signaling template distributed from the distribution server to the client device will be specifically described below. Additionally, the exemplary description will be specifically explained assuming that MPD in the XML format is distributed as signaling information using the XML signaling template.

(Exemplary Description of XML Signaling Template)

FIG. 10 is a diagram illustrating exemplary description of the XML signaling template.

The XML signaling template of FIG. 10 includes (b) XML element/attribute without dynamic change of content and (c) XML element/attribute with possible dynamic change of content which are identified by (a) XML signaling template identifier as described with reference to FIG. 7.

(a) XML signaling template identifier corresponds to (b) XML signaling template identifier designated by the differential information, and is referred to when the XML signaling template is selected.

Additionally, when the differential information is applied to the XML signaling template thereby to generate the XML signaling instance, relevant information for (b) XML element/attribute without dynamic change of content is assumed as information configuring the XML signaling instance. Further, the differential information is applied to the XML element/attribute with possible dynamic change of content to be dynamically changed.

(Exemplary Description of Differential Information)

Figure 11:
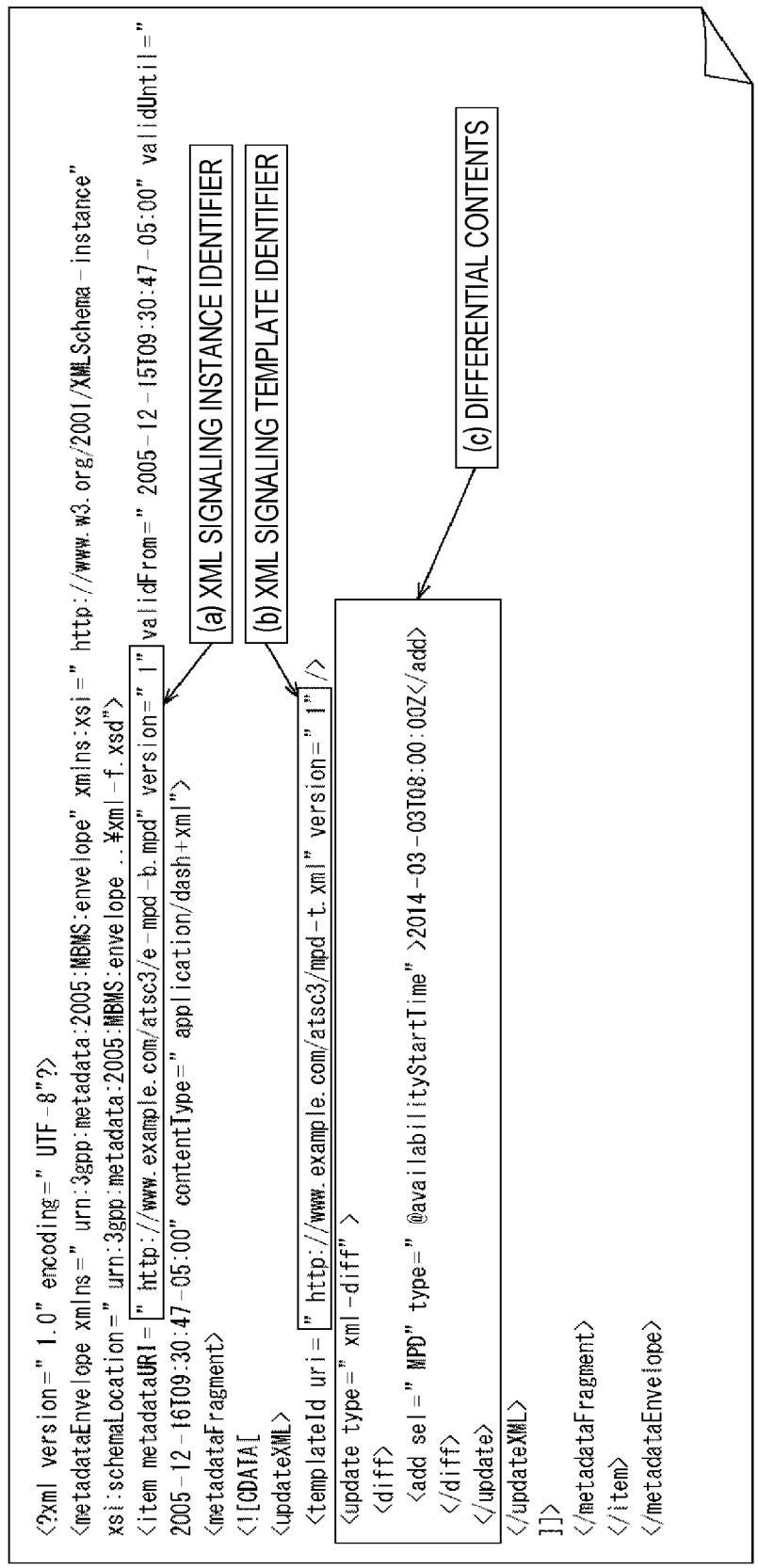
FIG. 11 is a diagram illustrating exemplary description of the differential information.

FIG. 11 is a diagram illustrating exemplary description of the differential information.

As described with reference to FIG. 9, the differential information of FIG. 11 includes (b) XML signaling template identifier and (c) differential contents which are identified by (a) XML signaling instance identifier. (b) XML signaling template identifier corresponds to (a) XML signaling template identifier designated by the XML signaling template, and the XML signaling template with the identifier matched is selected and referred to.

In FIG. 11, "<add sel="MPD" type="@availabilityStartTime">2014-03-03T08:00:00Z</add>" in (c) differential contents indicates additional information of availabilityStartTime attribute and its attribute value of "2014-03-03T08:00:00Z" to the MPD element in the XML signaling template of FIG. 10.

(Exemplary Description of XML Signaling Instance)

FIG. 12 is a diagram illustrating exemplary description of the XML signaling instance generated by applying the differential information of FIG. 11 to the XML signaling template of FIG. 10.

The XML signaling instance of FIG. 12 includes (b) XML signaling instance identified by (a) XML signaling instance identifier as described with reference to FIG. 8. Additionally, (b) XML signaling instance is configured of two items of information of (b1) XML element/attribute without dynamic change of content and (b2) XML element/attribute with dynamic change of content.

(b1) XML element/attribute without dynamic change of content is configured by use of relevant information in the XML signaling template of FIG. 10. On the other hand, (b2) XML element/attribute with dynamic change of content is obtained by applying the differential information of FIG. 11 to the XML signaling template of FIG. 10 to change its contents. Herein, the differential information is additional information of availabilityStartTime attribute and its attribute value of "2014-03-03T08:00:00Z" to the MPD element as described with reference to FIG. 11.

Therefore, in the XML signaling instance of FIG. 12, availabilityStartTime attribute and its attribute value of "2014-03-03T08:00:00Z" are added to the MPD element unlike the XML signaling template of FIG. 10. In this way, the contents of the differential information of FIG. 11 are added to the XML signaling template of FIG. 10 so that the XML signaling instance of FIG. 12 is generated. The content reception/reproduction processing is then performed in the client device on the basis of the thus-generated XML signaling instance (signaling information such as MPD, for example).

As described above, the distribution server earlier distributes continuously-available information among the signaling information in the XML format as XML signaling template (FIG. 10), and then distributes the differential information (FIG. 11) applied to the XML signaling template to generate the XML signaling instance (signaling information).

In the client device, the later-acquired differential information (FIG. 11) is applied to the earlier-acquired XML signaling template (FIG. 10) so that the XML signaling instance (FIG. 12) is generated. The content reception/reproduction processing is then performed in the client device on the basis of the generated XML signaling instance (FIG. 12).

At this time, the differential information (FIG. 11) distributed from the distribution server to the client device is smaller in data size than the signaling information (FIG. 12), and thus even the signaling information in the XML format can be efficiently distributed.

<2. Signaling Information Distribution Using LLS/SCS Signaling Templates>

As described above, the MPEG2-TS system is employed as a transmission system in a digital broadcasting standard in each country, and in the future, it is assumed that an IP transmission system using IP packets used in the field of communication for digital broadcasting is introduced to provide more advanced services. The digital broadcasting using the IP transmission system is expected to be employed particularly as a next-generation digital broadcasting standard of Advanced Television Systems Committee standards (ATSC) in the U.S.

Further, it is assumed that two items of signaling information of low layer signaling (LLS) and service channel signaling (SCS) are distributed in the digital broadcasting in the IP transmission system, but the signaling information is described in the text format such as XML document, and thus is larger in data size than data in the binary format like the signaling information described above. Consequently, a processing load on the distribution server increases, and a large bandwidth is consumed also in the distribution route.

Thus, according to the present technology, the signaling information distribution using the XML signaling template is applied also to the LLS or SCS signaling information in the digital broadcasting in the IP transmission system thereby to efficiently distribute the LLS or SCS signaling information in the text format.

(Protocol Stack in IP Transmission System)

Figure 13:
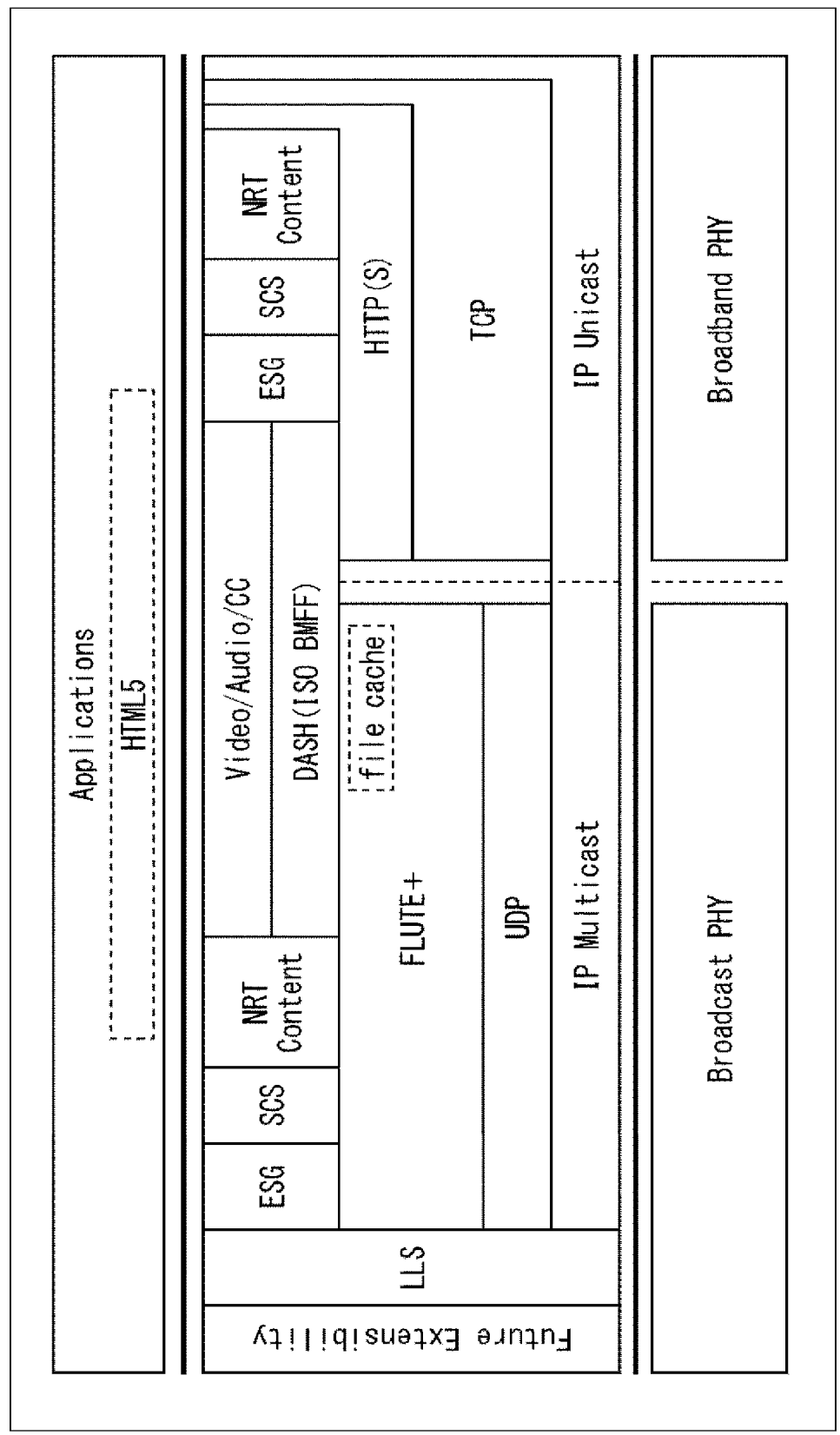
FIG. 13 is a diagram illustrating a protocol stack of digital broadcasting in an IP transmission system.

FIG. 13 is a diagram illustrating a protocol stack of digital broadcasting in the IP transmission system.

In FIG. 13, the lowest hierarchy is assumed as physical layer. In the digital broadcasting in the IP transmission system, partial data may be transmitted via communication not limited to broadcasting transmission, and in broadcasting, the physical layer (Broadcast PHY) corresponds to a frequency bandwidth of a broadcast wave assigned to a service (channel).

A hierarchy higher than the physical layer is assumed as IP layer. The IP layer corresponds to Internet protocol (IP) in the TCP/IP protocol stack, and its IP packet is specified by an IP address. A hierarchy adjacently higher than the IP layer is assumed as UDP layer, and a hierarchy higher than it is assumed as file delivery over unidirectional transport plus (FLUTE+). That is, in the digital broadcasting in the IP transmission system, a packet designated with IP address and UDP port number is transmitted so that a FLUTE session is established.

Additionally, FLUTE+ is extended conventionally-defined FLUTE, and FLUTE is defined as RFC6726 in detail. Further, FLUTE+ ("FLUTE plus") may be denoted by other name such as "FLUTE enhancement" or "enhanced FLUTE."

Part of a hierarchy adjacently higher than FLUTE+ is assumed as electronic service guide (ESG), service channel signaling (SCS), and NRT Content, and ESG, SCS, and NRT Content are transmitted in the FLUTE session. ESG is an electronic service guide (program information). NRT Content is transmitted in non real time (NRT) broadcasting, and is temporarily accumulated in a storage in the client device to be reproduced later. Additionally, NRT Content is an exemplary content, and a file of other content may be transmitted in the FLUTE session.

SCS is signaling information in units of service. SCS signaling information such as user service description (USD), media presentation description (MPD), session description protocol (SDP), file delivery Description (FDD), and service parameter Description (SPD) is defined. Additionally, USD, MPD, SDP, FDD, and SPD are described in the text format such as XML document.

USD includes reference information for referring to the signaling information such as MPD, FDD and SDP. Additionally, USD may be denoted as user service bundle description (USBD). MPD is stream control information including information on segment URL per stream (component) of contents transmitted in units of service. As described above, MPD conforms to the DASH standard.

SDP includes service-based service attribute, stream configuration information or attribute, filter information, location information, and the like. FDD includes index information per transport session identifier (TSI) such as location information (such as URL) or transport object identifier (TOI). Additionally, FDD may be included as element in USD. SPD is configured to include various parameters defined on a service basis.

Part of the hierarchy other than the above hierarchy in the hierarchy adjacently higher than FLUTE+ is assumed as DASH (ISO BMFF). Further, a hierarchy adjacently higher than DASH (ISO BMFF) is assumed as stream data of component such as video, audio, or subtitles. That is, the stream data of component such as audio, video, or subtitles configuring contents is transmitted in units of media segment conforming to ISO base media file format (BMFF) standard, or in the FLUTE session, for example.

Low layer signaling (LLS) is low layer signaling information, and is transmitted on the BBP stream. For example, the LLS signaling information such as service configuration description (SCD), emergency alerting description (EAD), and region rating description (RRD) is defined. Additionally, SCD, EAD, and RRD are described in the text format such as XML document, for example.

SCD employs an ID system corresponding to the ID system employed in the MPEG2-TS system, and defines therein a BBP stream configuration and a service configuration in a broadcasting network. Further, SCD includes service-based attribute/setting information, SC bootstrap information for accessing SCS, ESG bootstrap information for accessing ESG, and the like. EAD includes information on emergency alert. RRD includes rating information.

On the other hand, in using communication, a hierarchy higher than the physical layer (Broadband PHY) is assumed as IP layer. Further, a hierarchy adjacently higher than the IP layer is assumed as TCP layer, and a hierarchy adjacently higher than the TCP layer is assumed as HTTP(S) layer. That is, a protocol stack operating in a network such as the Internet is mounted by the hierarchies.

Thereby, the client device can receive ESG, SCS, NRT Content, and the like in communication with the communication server on Internet, for example, by use of the TCP/IP protocol. Further, the client device can receive steam data of audio or video which is adaptively streamed from the communication server on Internet. Additionally, the streaming conforms to the DASH standard.

Further, for example, Applications can be transmitted by use of the FLUTE session for broadcasting or the TCP/IP protocol for communication. The Applications can be described in a markup language such as hypertext markup language 5 (HTML5).

As described above, the digital broadcasting in the IP transmission system employs a protocol stack partially compatible with 3GPP-MBMS. Thereby, the stream data of audio or video configuring contents can be transmitted in units of media segment conforming to the ISO BMFF standard. Further, a common protocol can be employed in the hierarchies other than the physical layer (and the data link layer) lower than the IP layer, or the hierarchies higher than the IP layer whether the signaling information such as ESG or SCS is transmitted in broadcasting or communication, and thus it is expected that loads on the mounting or loads on the processing can be alleviated in the client device or the like.

(Configuration of Broadcast Wave in IP Transmission System)

Figure 14:
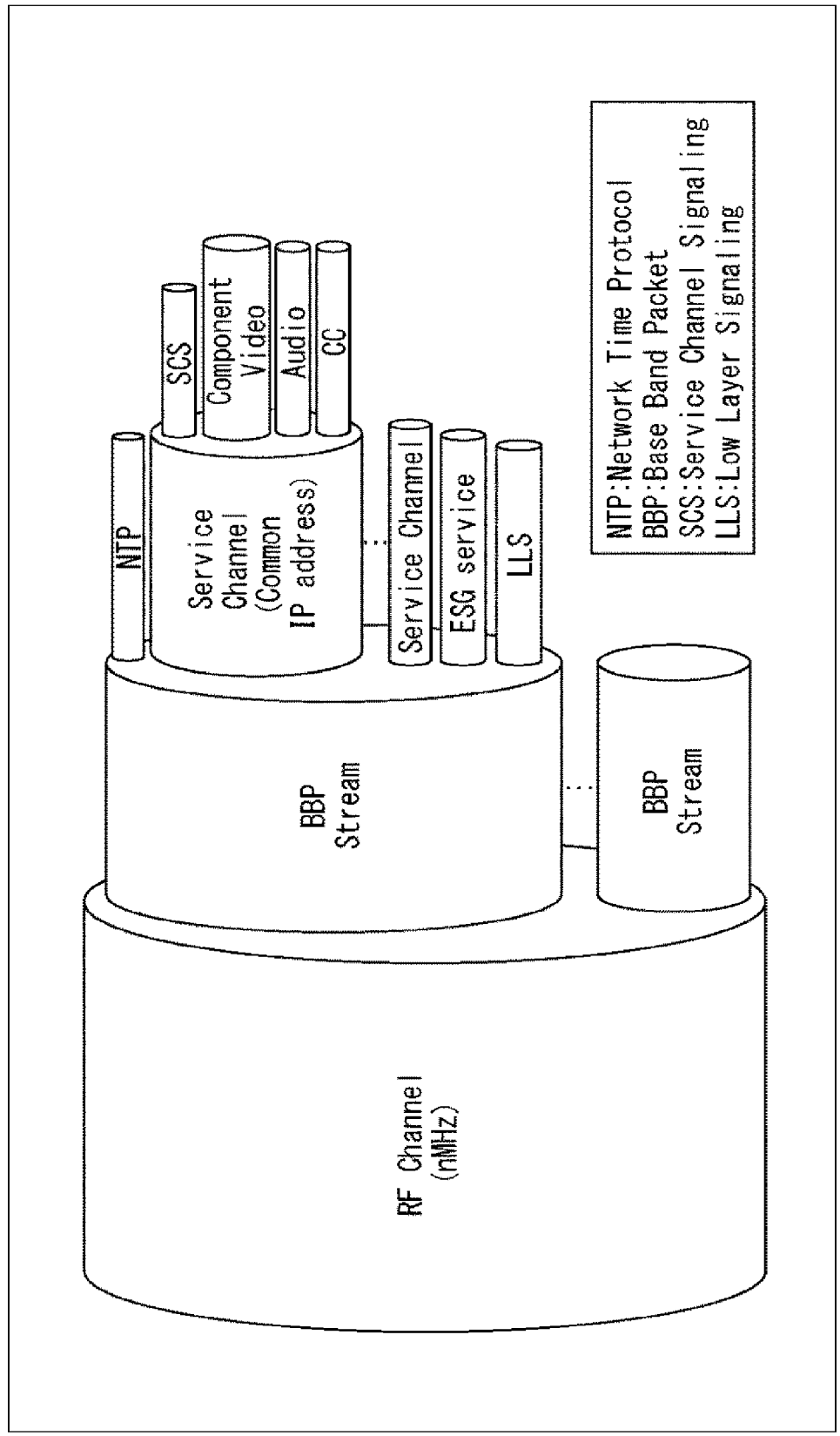
FIG. 14 is a diagram illustrating a configuration of a broadcast wave in the digital broadcasting in the IP transmission system.

FIG. 14 is a diagram illustrating a configuration of a broadcast wave of digital broadcasting in the IP transmission system.

In FIG. 14, a plurality of BBP streams are transmitted on a broadcast wave (RF channel) with a predetermined frequency bandwidth. Further, each BBP stream includes network time protocol (NTP), a plurality of service channels, ESG service (ESG), and LLS. Additionally, NTP, service channels, and ESG are transmitted according to the UDP/IP protocol, and LLS is transmitted on the BBP stream. Further, NIP is time information and can be common in a plurality of service channels.

Each service channel (which will be denoted as "service" below) includes component such as video, audio, or subtitles, and SCS such as USD or MPD, which are information configuring contents (such as program). Further, each service is given a specific IP address, and the component or SCS can be packaged for one or more services by use of the IP address.

Herein, the broadcast wave (RF channel) with a predetermined frequency bandwidth is assigned with a RF channel ID (RFchannelId) per broadcast carrier, for example. Further, one or more BBP streams transmitted in each broadcast wave are assigned with a BBP stream ID (bbpStreamId). Further, one or more services transmitted in each BBP stream are assigned with a service ID (serviceId).

In this way, the ID system in the IP transmission system employs a configuration corresponding to a combination of network ID, transport stream ID, and service ID used in the MPEG2-TS system (which will be denoted as "Triplet" below), and the BBP stream configuration and the service configuration in the broadcast network are indicated by the triplet.

By use of the ID system, consistency with the currently-available MPEG2-TS system can be obtained, and thus it can be easily applied to simulcast in transition from the MPEG2-TS system to the IP transmission system, for example. However, in the ID system in the IP transmission system, the RF channel ID and the BBP stream ID correspond to the network ID and the transport stream ID in the MPEG2-TS system.

(Outline of Signaling Information Distribution Using LLS/SCS Signaling Templates)

Figure 15:
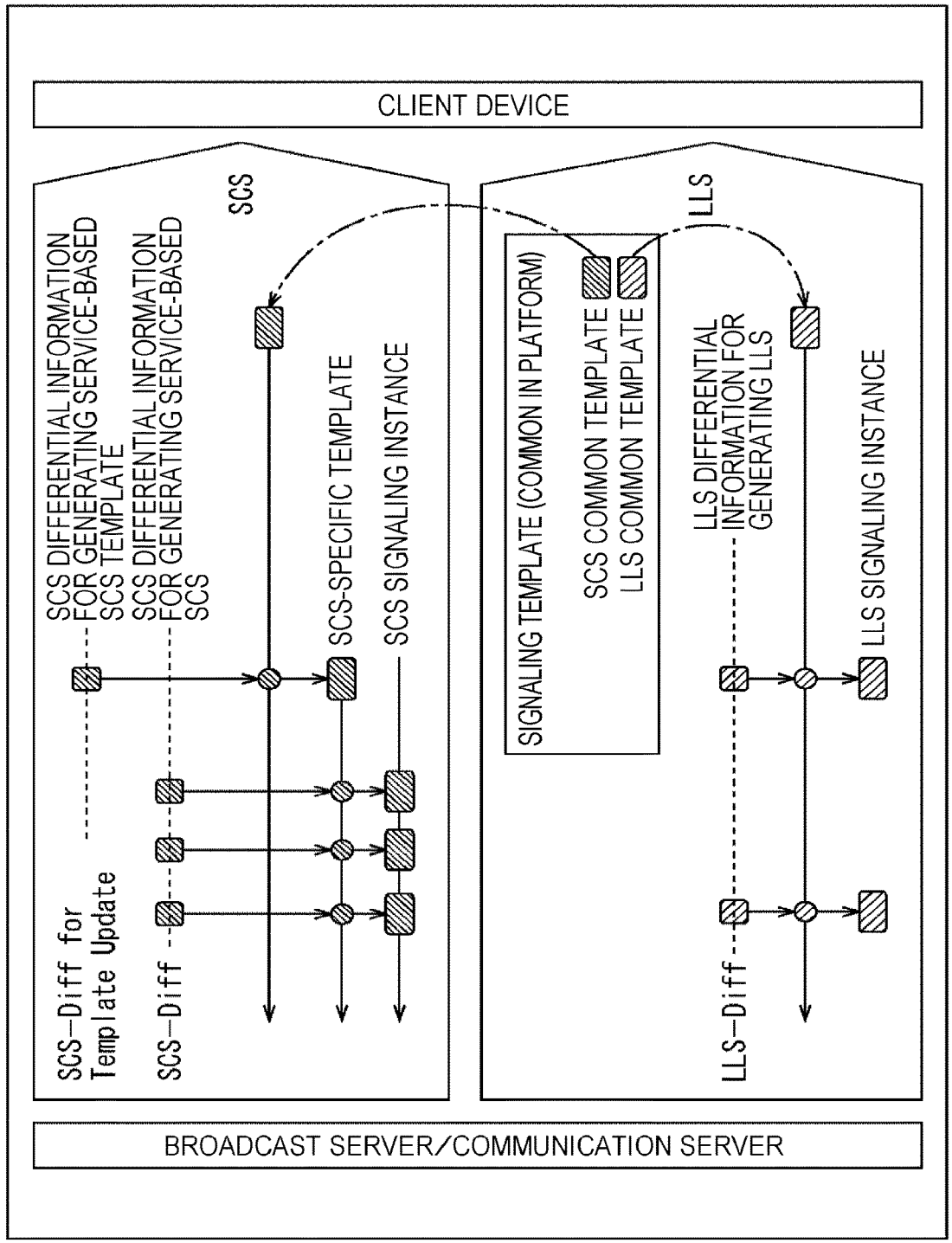
FIG. 15 is a diagram for explaining an outline of signaling information distribution using LLS/SCS signaling templates.

FIG. 15 is a diagram for explaining an outline of signaling information distribution using the LLS/SCS signaling templates. FIG. 15 schematically illustrates how the broadcast server or communication server as distribution server distributes LLS or SCS signaling information to the client device. Additionally, in FIG. 15, a direction of time is assumed from the right side toward the left side in the figure.

The LLS signaling information is a parameter not depending on a service such as the RF channel configuration, the BBP stream configuration, or the service configuration, and defines therein permanent information which is less frequently updated. The data in the text format such as SCD, EAD, or RRD is distributed as LLS signaling information.

In FIG. 15, the distribution server provides continuously-available information common in platform as template (which will be denoted as "LLS signaling template (LLS common template)" below), and provides a difference from the actually-available LLS signaling information (which will be denoted as "LLS signaling instance" below) as differential information (which will be denoted as "LLS differential information (LLS-Diff)" below) in the LLS signaling information such as SCD.

That is, the distribution server earlier provides the client device with the LLS signaling template, and then provides the client device with the LLS differential information so that the LLS differential information is applied to the LLS signaling template thereby to generate the LLS signaling instance in the client device.

In other words, the LLS signaling template corresponds to the above XML signaling template, the LLS differential information corresponds to the above differential information, and the LLS signaling instance corresponds to the above XML signaling instance.

Further, the SCS signaling information is a parameter depending on a service identified by an IP address, and defines therein information per service such as location information of streaming data. The data in the text format such as USD, MPD, SDP, FDD, or SPD is distributed as SCS signaling information.

In FIG. 15, the distribution server provides continuously-available information common in platform as template (which will be denoted as "SCS signaling template (SCS common template)" below) and provides a difference from the actually-available SCS signaling information (which will be denoted as "SCS signaling instance" below) as differential information (which will be denoted as "SCS differential information (SCS-Diff)" below) in the SCS signaling information such as USD.

However, the SCS signaling information is service-based information depending on a service, and thus continuously-available information is different per service. That is, information which is to be a template is different per service, and information common in services is provided as SCS common template, and a difference from a service-based template (which will be denoted as "SCS-specific template" below) is provided as differential information (which will be denoted as "SCS template differential information (SCS-Diff for Template Update" below).

In this way, the SCS signaling template is configured of the SCS common template and the SCS-specific template, and the SCS template differential information is applied to the SCS common template common in services thereby to generate the service-based SCS-specific template.

That is, the distribution server earlier provides the client device with the SCS signaling template (SCS common template), and then provides the SCS template differential information so that the SCS template differential information is applied to the SCS common template thereby to generate the SCS-specific template in the client device. Thereafter, the distribution server provides the client device with the SCS differential information so that the SCS differential information is applied to the SCS-specific template thereby to generate the SCS signaling instance in the client device.

In other words, the SCS common template and the SCS-specific template correspond to the above XML signaling template, the SCS differential information and the SCS template differential information correspond to the above differential information, and the SCS signaling instance corresponds to the above XML signaling instance.

A specific configuration of the signaling information using the LLS/SCS signaling templates distributed from the distribution server to the client device will be described below.

(LLS Signaling Template)

Figure 16:
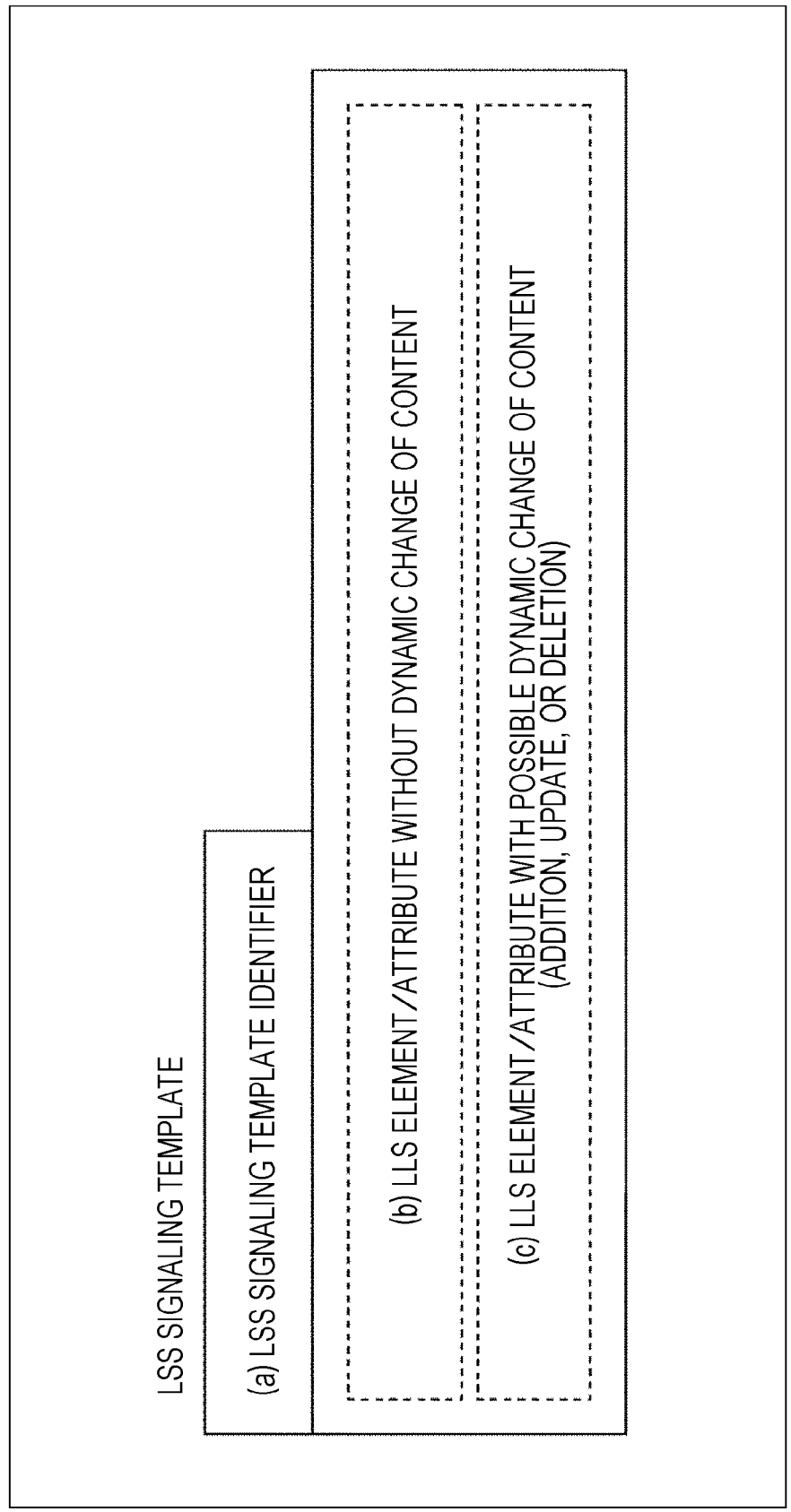
FIG. 16 is a diagram illustrating a configuration of the LLS signaling template.

FIG. 16 is a diagram illustrating a configuration of the LLS signaling template shared between the distribution server and the client device.

In FIG. 16, the LLS signaling template includes (b) LLS element/attribute without dynamic change of content and (c) LLS element/attribute with possible dynamic change of content which are identified by (a) LLS signaling template identifier. Additionally, (a) LLS signaling template identifier can include version information.

(b) LLS element/attribute without dynamic change of content is continuously-available information common in platform in the content reception/reproduction processing in the client device, and is configured of the element information and the attribute information of data in the text format common in a plurality of LLS signaling instances, for example.

(c) LLS element/attribute with possible dynamic change of content is not continuously-available information common in platform but information whose contents can be added, updated or deleted in the content reception/reproduction processing in the client device, and is configured of the element information and the attribute information of data in the text format unique to specific LLS signaling instance, for example.

(SCS Signaling Template)

Figure 17:
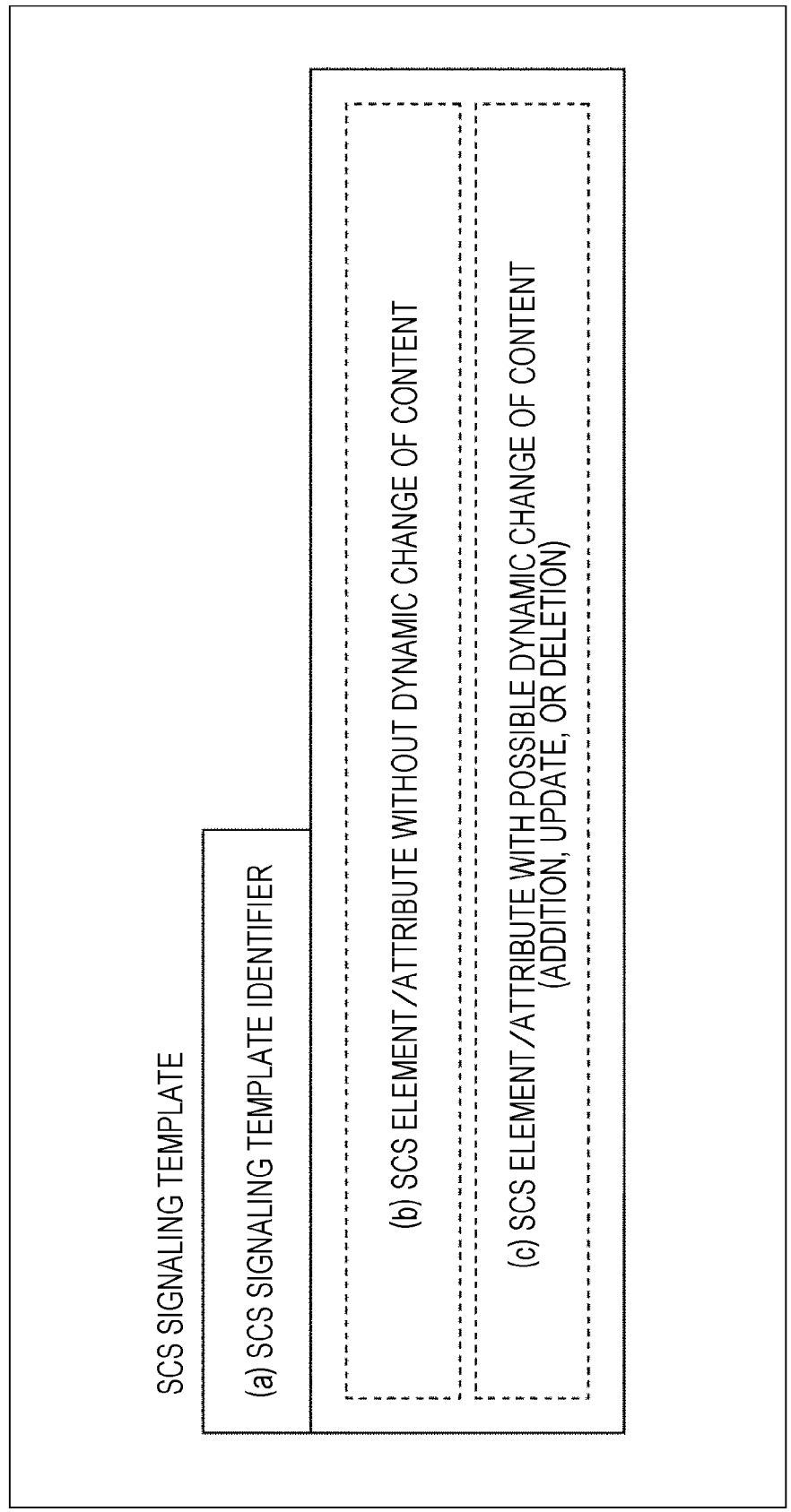
FIG. 17 is a diagram illustrating a configuration of the SCS signaling template.

FIG. 17 is a diagram illustrating a configuration of the SCS signaling template shared between the distribution server and the client device.

In FIG. 17, the SCS signaling template includes (b) SCS element/attribute without dynamic change of content and (c) SCS element/attribute with possible dynamic change of content which are identified by (a) SCS signaling template identifier. (a) SCS signaling template identifier can include version information.

(b) SCS element/attribute without dynamic change of content is continuously-available information common in platform in the content reception/reproduction processing in the client device, and is configured of the element information and the attribute information of data in the XML format common in a plurality of SCS signaling instances, for example.

(c) SCS element/attribute with possible dynamic change of content is not continuously-available information common in platform but information whose contents can be added, updated, or deleted in the content reception/reproduction processing in the client device, and is configured of the element information and the attribute information of data in the text format unique to a specific SCS signaling instance.

(LLS/SCS Signaling Instances)

Figure 18:
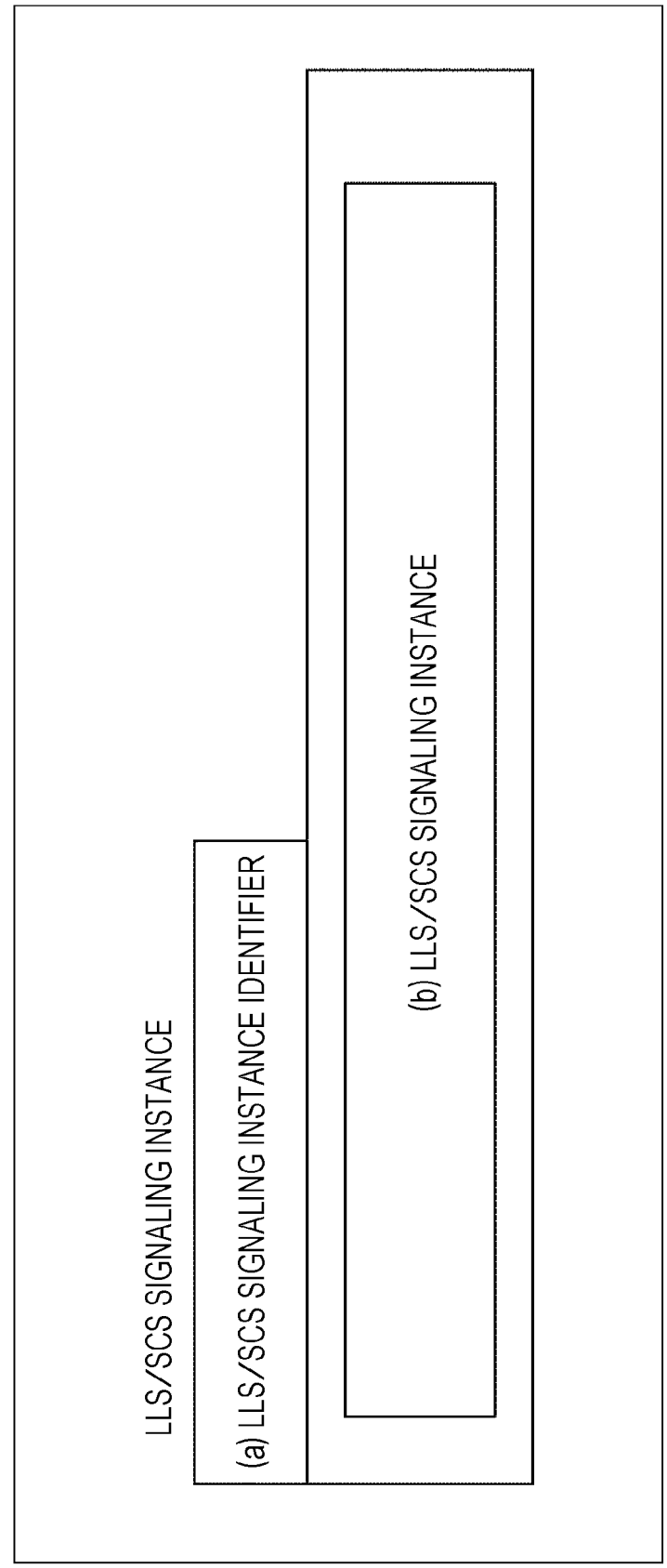
FIG. 18 is a diagram illustrating a configuration of a LLS/SCS signaling instance.

FIG. 18 is a diagram illustrating a configuration of the LLS signaling instance and the SCS signaling instance generated by the distribution server or the client device.

In FIG. 18, the LLS signaling instance includes (b) LLS signaling instance identified by (a) LLS signaling instance identifier. Additionally, (a) LLS signaling instance identifier can include version information.

(b) LLS signaling instance is data in the text format including a parameter not depending on a service such as RF channel configuration, which is used in the content reception/reproduction processing in the client device. The LLS signaling instance corresponds to the LLS signaling information such as SCD, EAD, or RRD.

Further, in FIG. 18, the SCS signaling instance includes (b) SCS signaling instance identified by (a) SCS signaling instance identifier. Additionally, (a) SCS signaling instance identifier can include version information.

(b) SCS signaling instance is data in the text format including a parameter depending on a service such as location information of streaming data, which is used in the content reception/reproduction processing in the client device. The SCS signaling instance corresponds to the SCS signaling information such as USD, MPD, SDP, FDD, or SPD.

(LLS/SCS Differential Information)

Figure 19:
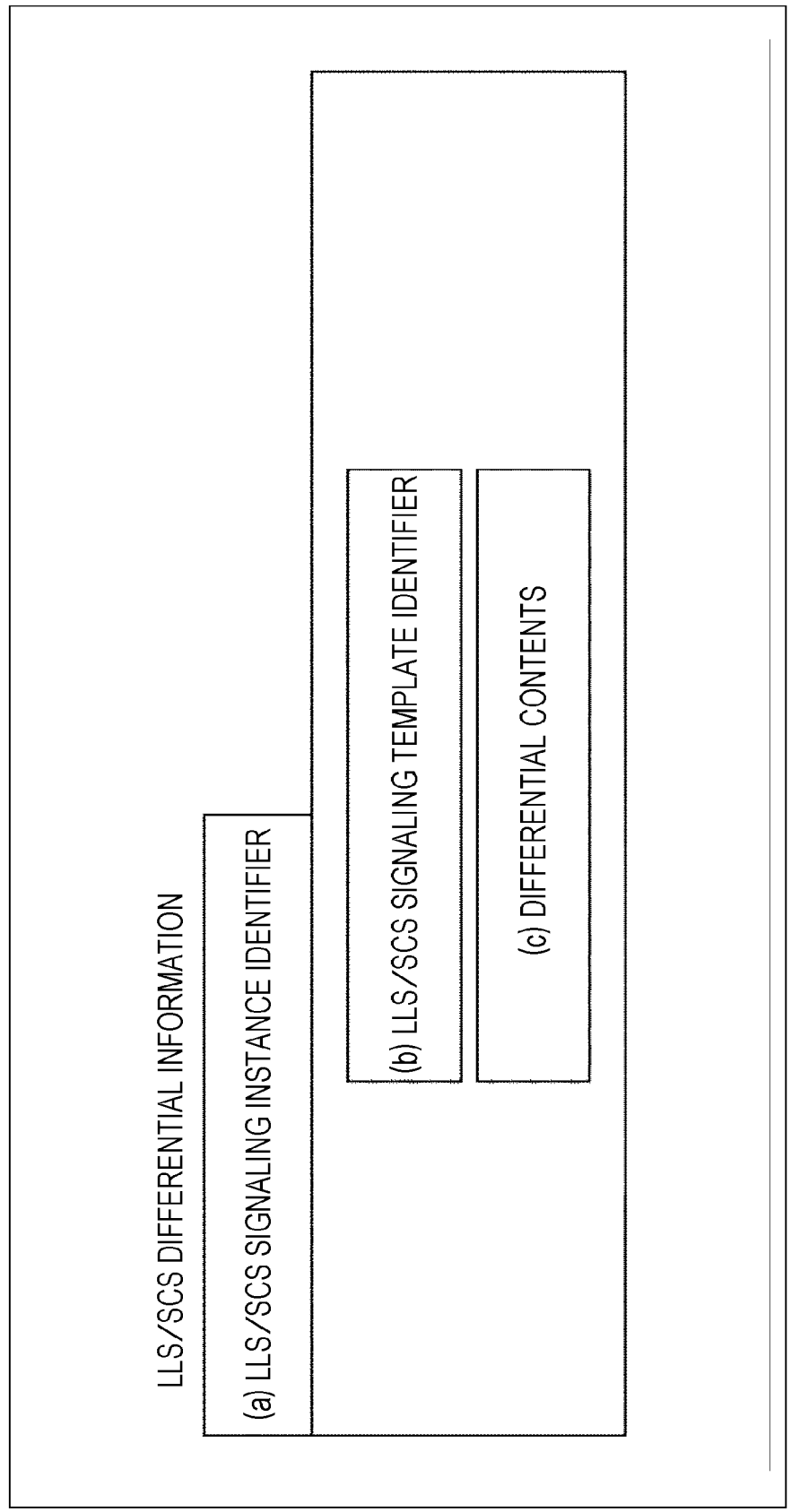
FIG. 19 is a diagram illustrating a configuration of LLS/SCS differential information.

FIG. 19 is a diagram illustrating a configuration of LLS differential information and SCS differential information distributed by the distribution server. Further, the LLS/SCS differential information of FIG. 19 may indicate a configuration of the LLS differential information and the SCS differential information received by the client device.

In FIG. 19, the LLS differential information includes (b) LLS signaling template identifier and (c) differential contents which are identified by (a) LLS signaling instance identifier. Additionally, (a) LLS signaling instance identifier can include version information.

(b) LLS signaling template identifier is information for uniquely identifying the LLS signaling template. Additionally, the LLS signaling template identifier can include version information.

(c) Differential contents are information on a difference between the LLS signaling template and the LLS signaling instance, and includes dynamically-applied information. Further, the differential contents include application form information on an application form of any of addition, change, or deletion of information for the LLS signaling template.

Figure 20:
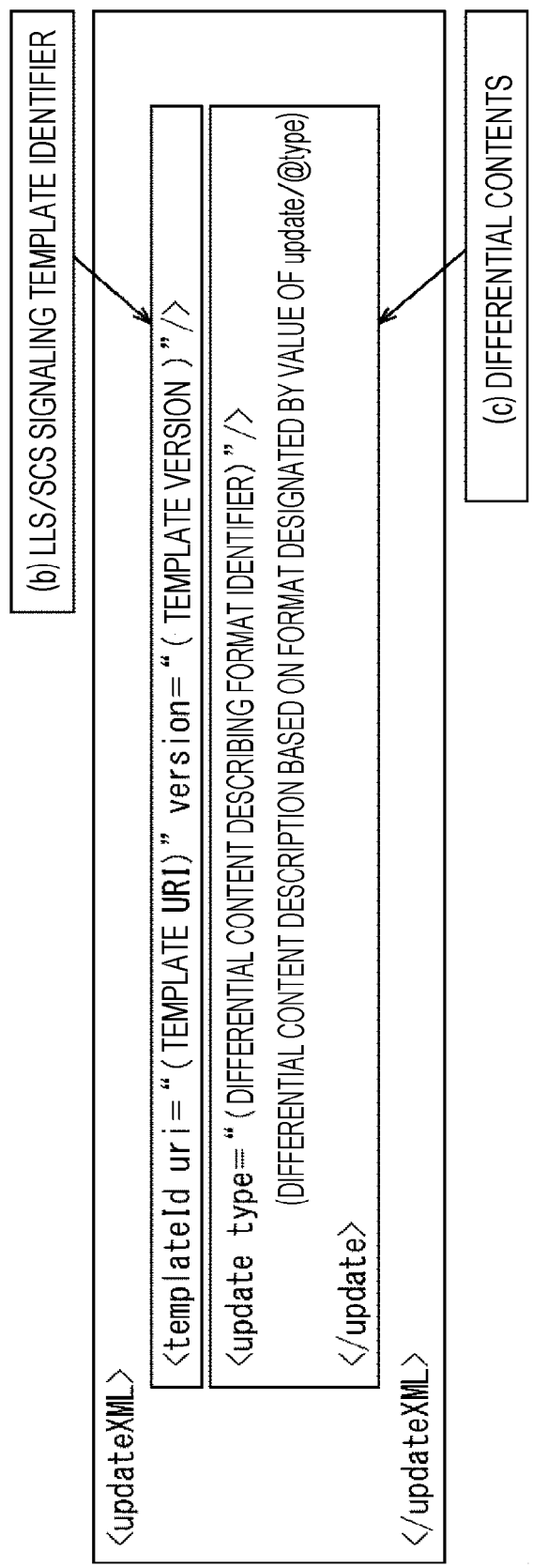
FIG. 20 is a diagram illustrating exemplary description of the LLS/SCS differential information.

Herein, as illustrated in FIG. 20, the LLS differential information described as XML document includes templateId element and update element as child elements of the updateXML element for describing (c) differential contents.

The templateId element includes uri attribute and version attribute. The uri attribute is designated with uniform resource identifier (URI) indicating (b) LLS signaling template identifier. Further, the version attribute is designated with version information of the LLS signaling template.

The update element includes type attribute. The type attribute is designated with the identifier of a description format of the LLS differential contents. In the case of the LLS differential information, "LLS-diff" or the like is designated as type attribute, for example. Further, (c) differential contents based on the description format designated by the attribute value of the type attribute in the update element are described between the start tag and the end tag of the update element. Additional information on specific element or attribute for the SCD element is described therebetween, for example.

Returning to the description of FIG. 19, in FIG. 19, the SCS differential information includes (b) SCS signaling template identifier and (c) differential contents which are identified by (a) SCS signaling instance identifier. Additionally, (a) SCS signaling instance identifier can include version information.

(b) SCS signaling template identifier is information for uniquely identifying the SCS signaling template. Additionally, the SCS signaling template identifier can include version information.

(c) Differential contents are information on a difference between the SCS signaling template and the SCS signaling instance, and include dynamically-applied information. Further, (c) differential contents include application form information on an application form of any of addition, change or deletion of information for the SCS signaling template.

Herein, as illustrated in FIG. 20, the SCS differential information described as XML document includes templateId element and update element as child elements of the updateXML element for describing (c) differential contents.

In the templateId element, the uri attribute is designated with URI indicating (b) SCS signaling template identifier. Further, the version attribute is designated with version information of the SCS signaling template.

In the update element, the type attribute is designated with the identifier of a description format of the SCS differential contents. In the case of the SCS differential information, "SCS-diff" or the like is designated as type attribute, for example. Further, (c) differential contents based on the description format designated by the attribute value of the type attribute in the update element are described between the start tag and the end tag of the update element. Additional information on specific element or attribute for the MPD element is described therebetween, for example.

Additionally, a method for describing the LLS/SCS differential information can employ various methods using XML document conversion language such as extensible stylesheet language transformations (XSLT), for example. Further, the LLS/SCS differential information is described herein, and the SCS template differential information may have a similar configuration.

(Method for Distributing LLS/SCS Signaling Templates)

A method for distributing LLS/SCS signaling templates may be a method for storing the LLS/SCS signaling templates in SCD and distributing SCD by the LLS signaling information, and a method for distributing the LLS/SCS signaling templates as different fragments in the same LLS channel as the LLS signaling information.

Figure 21:
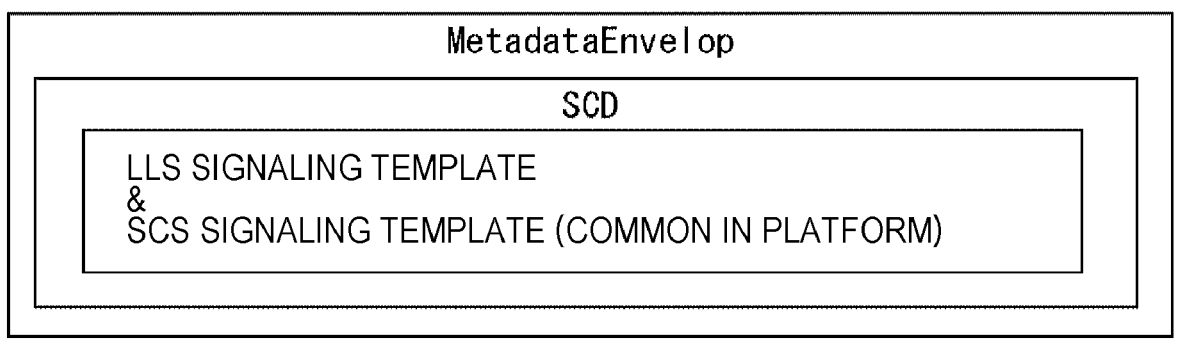
FIG. 21 is a diagram illustrating an example in which the LLS/SCS signaling templates are stored in SCD and distributed by LLS.

As illustrated in FIG. 21, when stored in SCD and distributed, the LLS signaling template and the SCS signaling template are stored in SCD. However, the SCS signaling template is assumed as SCS common template common in platform. Further, FIG. 21 illustrates an example in which SCD is stored in MetadataEnvelop defined in 3GPP and distributed. Additionally, a configuration of SCD storing the LLS/SCS signaling templates therein will be described with reference to a syntax or the like of SCD of FIG. 23 described below.

Figure 22:
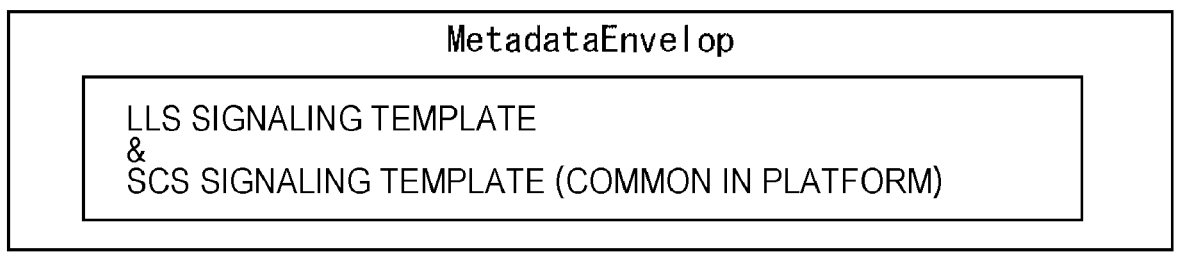
FIG. 22 is a diagram illustrating an example in which the LLS/SCS signaling templates are distributed as new different fragments.

Further, as illustrated in FIG. 22, when distributed as different fragments, the LLS signaling template and the SCS signaling template are directly stored in MetadataEnvelop. However, also in this case, the SCS signaling template is assumed as SCS common template common in platform.

(Configuration of SCD Storing LLS/SCS Signaling Templates Therein)

FIG. 23 is a diagram illustrating an exemplary syntax of SCD storing the LLS/SCS signaling templates therein.

SCD is described as XML document. Additionally, in FIG. 23, the attributes are attached with "@" among the elements and attributes. Further, the indented elements and attributes are designated for their higher elements.

As illustrated in FIG. 23, the SCD element is the ancestor element of majorProtocolversion attribute, minorProtocolversion attribute, RFchannelId attribute, name attribute, Tuning_RF element, LLSSignalingtemplate element, SCS-Signalingtemplate element, and BBPStream element.

The majorProtocolversion attribute and the minorProtocolversion attribute are designated with protocol version information. The RFchannelId attribute is designated with the RFchannelID of a broadcast station in units of physical channel. The name attribute is designated with the name of a broadcast station in units of physical channel.

The Tuning_RF element is designated with tuning information. The Tuning_RF element is the ancestor element of frequency attribute and Preamble attribute. The frequency attribute is designated with a frequency to tune a predetermined bandwidth. The Preamble attribute is designated with control information on the physical layer.

The LLSSignalingtemplate element is designated with information on the LLS signaling template. The LLSSignalingtemplate element is the ancestor element of Uri attribute. The Uri attribute is designated with URI for acquiring the LLS signaling template.

For example, the Uri attribute is designated with URI for identifying a fragment when the LLS signaling template is distributed as different fragment in the same LLS channel as the LLS signaling information. Further, for example, when the LLS signaling template is distributed from a communication server 30, URL (URI) for acquiring the LLS signaling template is designated.

Figure 24:
FIG. 24 is a diagram illustrating exemplary description when the LLS/SCS signaling templates are stored in SCD.

Herein, when the LLS signaling template itself is stored in SCD and distributed, as illustrated in FIG. 24, MetadataEnvelop storing the LLS signaling template therein is arranged between the start tag and the end tag of the LLSSignalingtemplate element, for example.

Figure 25:
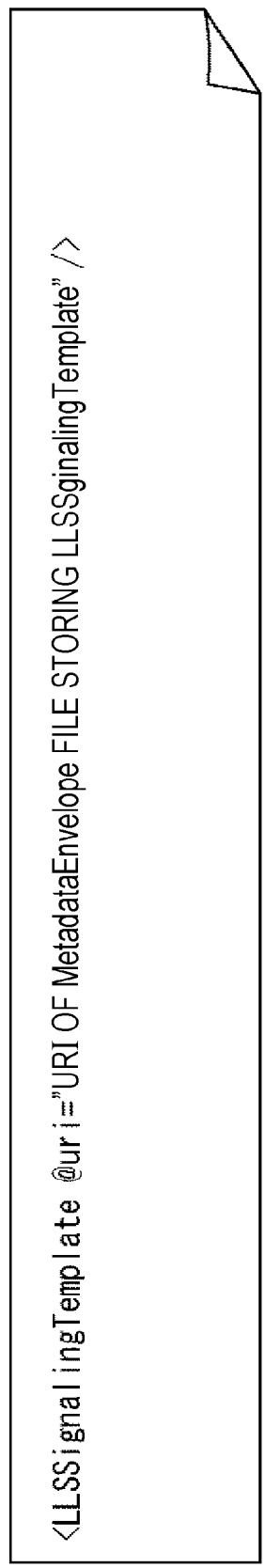
FIG. 25 is a diagram illustrating exemplary description when information on a reference destination of the LLS/SCS signaling template is stored in SCD.

Further, when URI for acquiring the LLS signaling template is designated by the Uri attribute, as illustrated in FIG. 25, URI of the MetadataEnvelop file storing the LLS signaling template therein can be designated as Uri attribute of the LLSSignalingtemplate element, for example. Thereby, a client device 50 can acquire the LLS signaling template with reference to the MetadataEnvelop file according to the URI.

Returning to the description of FIG. 23, the SCSSignalingtemplate element is designated with information on the SCS signaling template. The SCSSignalingtemplate element is the ancestor element of the Uri attribute. The Uri attribute is designated with URI for acquiring the SCS signaling template.

For example, the Uri attribute is designated with URI for identifying a fragment when the SCS signaling template (SCS common template) is distributed as different fragment in the same LLS channel as the LLS signaling information. Further, for example, when the SCS signaling template (SCS common template) is distributed from the communication server 30, URL (URI) for acquiring the SCS signaling template is designated.

Herein, when the SCS signaling template (SCS common template) itself is stored in SCD and distributed, MetadataEnvelop storing the SCS signaling template (SCS common template) therein is arranged between the start tag and the end tag of the SCSSignalingtemplate element, for example.

That is, the example of FIG. 24 illustrates exemplary description of the LLSSignalingtemplate element, and MetadataEnvelop storing the SCS signaling template (SCS common template) therein is similarly arranged as in the case of the SCSSignalingtemplate element.

Further, when URI for acquiring the SCS signaling template (SCS common template) is designated by the Uri attribute, URI of the MetadataEnvelop file storing the SCS signaling template therein can be designated as Uri attribute of the SCSSignalingtemplate element, for example.

That is, the example of FIG. 25 illustrates exemplary description of the Uri attribute of the LLSSignalingtemplate element, and URI of the MetadataEnvelop file storing the SCS signaling template therein is similarly designated as in the case of the Uri attribute of the SCSSignalingtemplate element. Thereby, the client device 50 can acquire the SCS signaling template with reference to the MetadataEnvelop file according to the URI.

The BBPStream element is designated with information on one or more BBP streams. The BBPStream element is the ancestor element of bbpStreamId element, payloadType attribute, name attribute, ESGBootstrap element, ClockReferenceInformation element, and Service element.

The bbpStreamId attribute is designated with a BBP stream ID. When a plurality of BBP streams are arranged, they are identified by the bbpStreamId attribute. The payloadType attribute is designated with a payload type of the BBP stream. The name attribute is designated with the name of the BBP stream.

The ESGBootstrap element is designated with access information to ESG. The ESGBootstrap element is the ancestor element of ESGProvider element. The ESGProvider element is designated with information on ESG per ESG provider. The ESGProvider element is the ancestor element of providerName attribute and ESGBroadbandLocation element. The providerName attribute is designated with the name of the ESG provider. When ESG is transmitted via communication, the ESGBroadbandLocation element is designated with URL for accessing the ESG file by the ESGurl attribute.

The ClockReferenceInformation element is designated with information on time information (such as NTP). The ClockReferenceInformation element is the ancestor element of sourceIPAddress attribute, destinationIPAddress attribute, and portNum attribute. The sourceIPAddress attribute and the destinationIPAddress attribute are designated with the IP addresses of the source and the destination for transmitting the time information. The portNum attribute is designated with a port number for transmitting the time information.

The Service element is designated with information on one or more services. The Service element is the ancestor element of serviceId attribute, serviceType attribute, hidden attribute, hiddenGuide attribute, shortName attribute, longName attribute, accesControl attribute, SourceOrigin element, SCBootstrap element, and AssociatedService element.

The servieId attribute is designated with a service ID. When a plurality of services are arranged, they are identified by the serviceId attribute. The serviceType attribute is designated with service type information.

The hidden attribute and the hiddenGuide attribute are designated with whether the service identified by the service ID is a hidden service. When "on" is designated for the attribute value, the service is hidden. The shortName attribute and the longName attribute are designated with the name of a service identified by the service ID. The accesControl attribute is designated with whether the service identified by the service ID is encrypted.

The SourceOrigin element is designated with information for identifying a service. The SourceOrigin element is the ancestor element of country attribute, originalRFchannelId attribute, bbpStreamId attribute, and serviceId attribute. The country attribute is designated with a country code. The originalRFchannelId attribute is designated with an original RF channel ID. The original RF channel ID is an ID for identifying a broadcast network, and also when the service is retransmitted, the same value is used. The bbpStreamId attribute is designated with a BBP stream ID. The serviceId attribute is designated with a service ID.

The SCBootstrap element is designated with access information to a service. The SCBootstrap element is the ancestor element of sourceIPAddress attribute, destinationIPAddress attribute, portNum attribute, and tsi attribute. The sourceIPAddress attribute and the destinationIPAddress attribute are designated with the IP addresses of the source and the destination for transmitting a service. The portNum attribute is designated with a port number for transmitting SCS. The tsi attribute is designated with TSI in the FLUTE session for transmitting SCS.

The AssociatedService element is designated with information on an associated subordinated service. The AssociatedService element is the ancestor element of RFchannelId attribute, bbpStreamId attribute, and serviceId attribute. The RFchannelId attribute is designated with a RF channel ID of the associated subordinated service. The bbpStreamId attribute is designated with a BBP stream ID of the associated subordinated service. The serviceId attribute is designated with a service ID of the associated subordinated service.

Additionally, in FIG. 23, when "1" is designated for cardinality, only one element or attribute therefor is always designated, and when "0 . . . 1" is designated, an element or attribute therefor is arbitrarily designated. Further, when "1 . . . n" is designated, one or more elements or attributes therefor are designated, and when "0 . . . n" is designated, one or more elements or attributes therefor are arbitrarily designated.

<3. Configuration of System>

(Exemplary Configuration of Broadcast Communication System)

Figure 26:
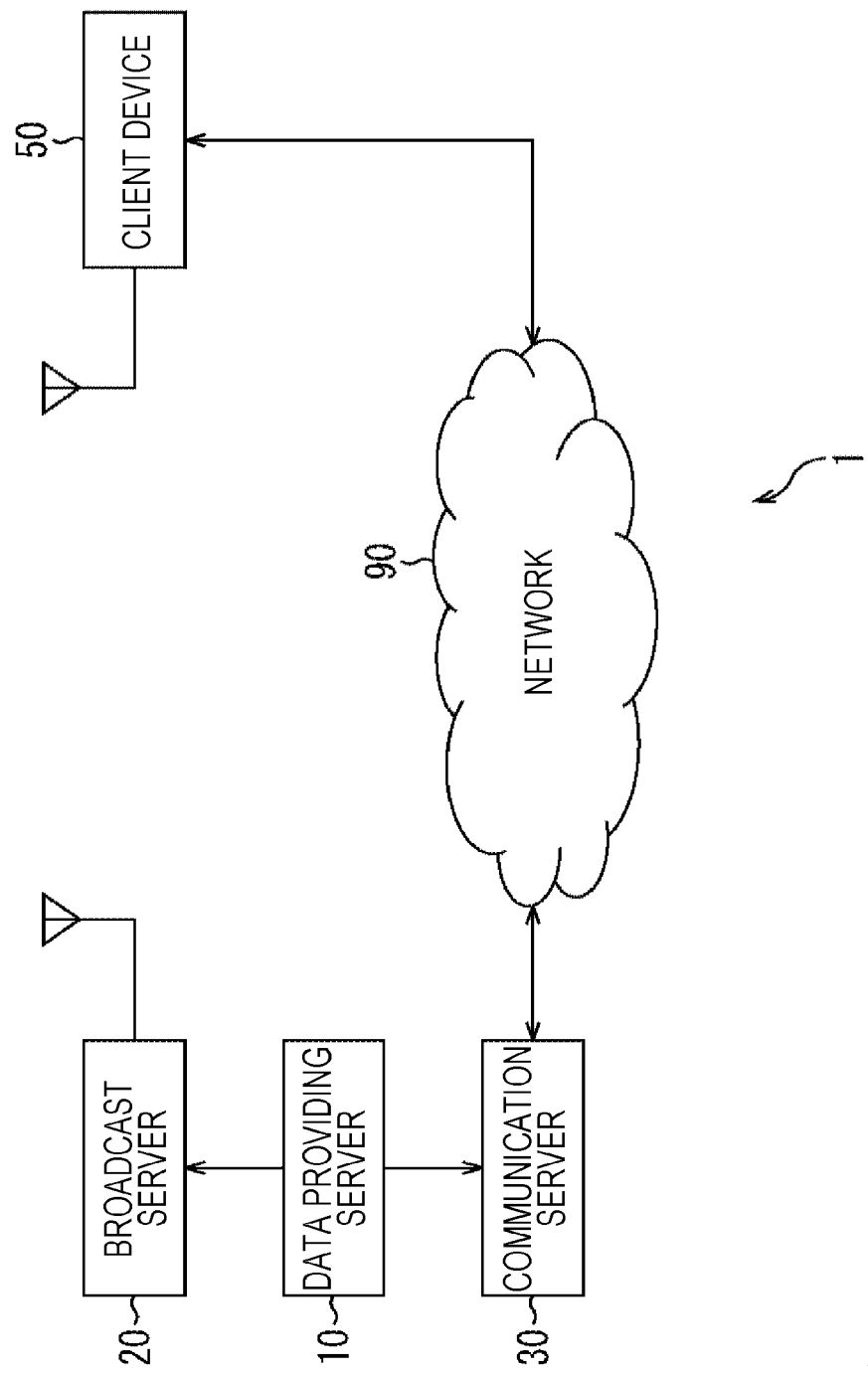
FIG. 26 is a diagram illustrating an exemplary configuration of a broadcast communication system.

FIG. 26 is a diagram illustrating an exemplary configuration of a broadcast communication system to which the present technology is applied. Additionally, the system indicates a set of components (such as devices).

A broadcast communication system 1 of FIG. 26 is a system capable of realizing a signaling information distribution service using the LLS/SCS signaling templates described above. In FIG. 26, the broadcast communication system 1 is configured of a data providing server 10, a broadcast server 20, the communication server 30, and the client device 50. Further, the client device 50 is connected to the communication server 30 via a network 90 such as the Internet.

The data providing server 10 accumulates stream data or metadata of contents made of various components such as audio, video, and subtitles. The data providing server 10 generates segment data on the basis of the content stream data and transmits it to the broadcast server 20 or the communication server 30. Further, the data providing server 10 generates signaling information on the basis of signaling-associated information for generating the content metadata or signaling information, and transmits it to the broadcast server 20 or the communication server 30.

Additionally, the contents are configured of one or more components such as audio, video, or subtitles. Further, when a content stream is transmitted in the FLUTE session or the like, the segment data is acquired by dividing a file of each component into segments conforming to the ISO base media file format (BMFF) rule. Additionally, a segment is configured of an initialization segment and a media segment, and these segments are not particularly discriminated for simplified description.

The broadcast server 20 receives the segment data and the signaling information transmitted from the data providing server 10. The broadcast server 20 generates the LLS signaling template (LLS common template) and the SCS signaling template (SCS common template) on the basis of the signaling information from the data providing server 10, and transmits them on a digital broadcast signal together with the segment data.

Further, the broadcast server 20 generates the differential information such as LLS differential information, SCS differential information, or SCS template differential information on the basis of the signaling information from the data providing server 10, and transmits it on a digital broadcast signal together with the segment data.

Additionally, the broadcast server 20 corresponds to the above distribution server (broadcast server) as transmission device, and is provided by a broadcasting carrier, for example.

The communication server 30 receives the segment data and the signaling information transmitted from the data providing server 10. The communication server 30 generates the LLS signaling template (LLS common template) and the SCS signaling template (SCS common template) on the basis of the signaling information from the data providing server 10. Further, the communication server 30 generates the differential information such as LLS differential information, SCS differential information, or SCS template differential information on the basis of the signaling information from the data providing server 10.

The communication server 30 transmits the segment data, the LLS/SCS signaling templates, and the differential information such as LLS/SCS differential information to the client device 50 via the network 90 in response to a request from the client device 50.

Additionally, the communication server 30 corresponds to the above distribution server (communication server) as transmission device, and is provided by a broadcasting carrier, for example.

The client device 50 receives the LLS/SCS signaling templates and the differential information such as LLS/SCS differential information transmitted on a digital broadcast signal from the broadcast server 20. Further, the client device 50 receives the LLS/SCS signaling templates and the differential information such as LLS/SCS differential information transmitted from the communication server 30 via the network 90 in response to the request to the communication server 30.

The client device 50 applies the LLS differential information to the LLS signaling template transmitted in broadcasting or communication thereby to generate the LLS signaling instance. Further, the client device 50 applies the SCS template differential information and the SCS differential information to the SCS signaling template transmitted in broadcasting or communication thereby to generate the SCS signaling instance. The client device 50 then acquires the segment data transmitted in broadcasting or communication and reproduces video and audio of the contents on the basis of the generated LLS signaling instance (LLS signaling information) or SCS signaling instance (SCS signaling information).

Additionally, the client device 50 corresponds to the above client device as reception device, and is installed at each home of a user, for example. For example, the client device 50 is configured as TV set, Smartphone or cell phone, tablet terminal device, personal computer or the like.

The broadcast communication system 1 is configured as described above. A detailed configuration of each device configuring the broadcast communication system 1 of FIG. 26 will be described below.

(Exemplary Configurations of Devices on Transmission Side)

Figure 27:
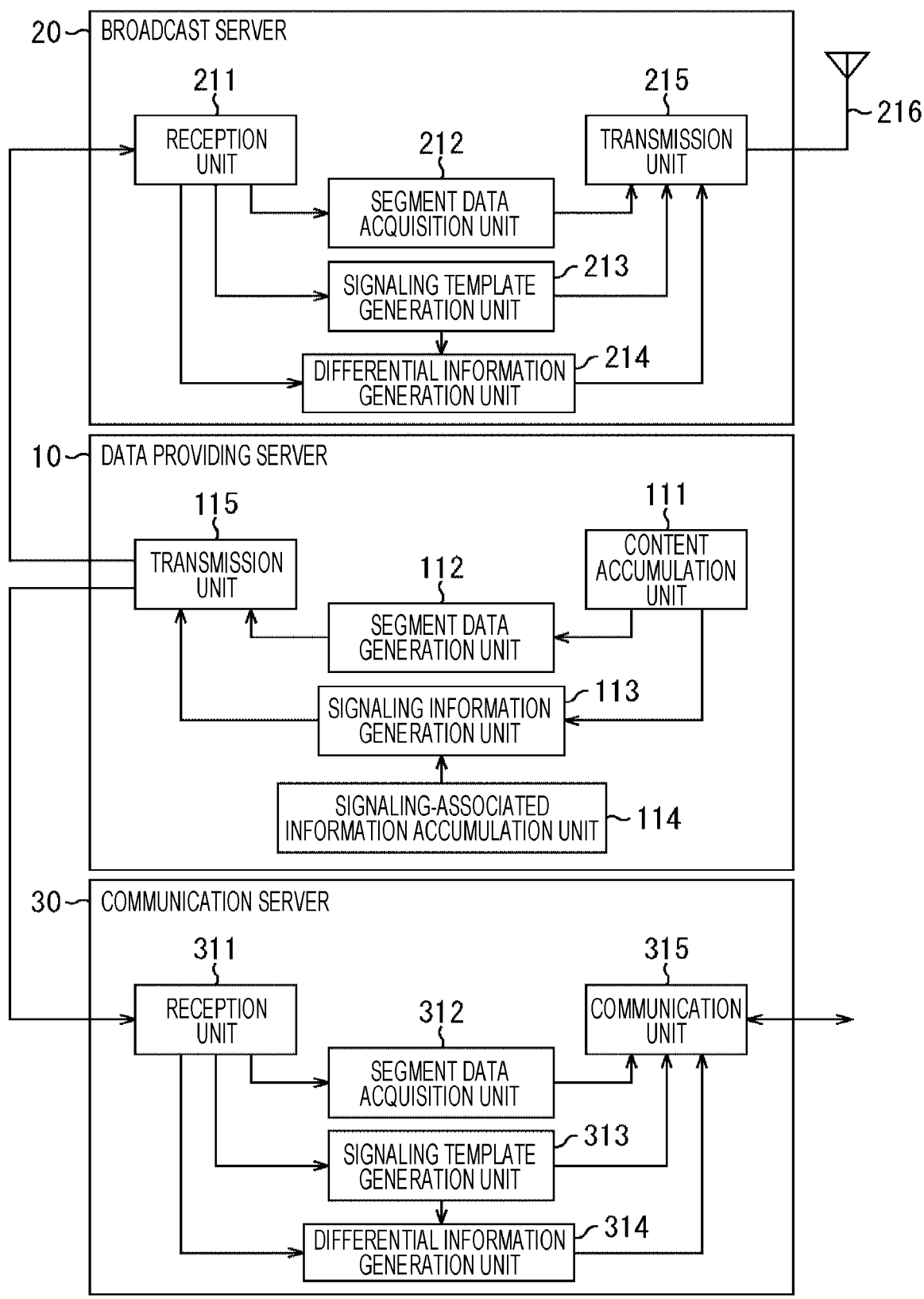
FIG. 27 is a diagram illustrating exemplary configurations of respective servers.

FIG. 27 is a diagram illustrating the exemplary configurations of the respective servers of FIG. 26.

In FIG. 27, the data providing server 10 is configured of a content accumulation unit 111, a segment data generation unit 112, a signaling information generation unit 113, a signaling-associated information accumulation unit 114, and a transmission unit 115.

The content accumulation unit 111 accumulates stream data and metadata of contents made of various components such as audio, video, and subtitles.

The segment data generation unit 112 acquires the stream data of contents such as audio or video accumulated in the content accumulation unit 111. The segment data generation unit 112 generates the segment data on the basis of the stream data of contents and supplies it to the transmission unit 115.

The signaling information generation unit 113 acquires the content metadata accumulated in the content accumulation unit 111 and the signaling-associated information for generating the signaling information accumulated in the signaling-associated information accumulation unit 114. The signaling information generation unit 113 generates the signaling information on the basis of the metadata and the signaling-associated information, and supplies it to the transmission unit 115.

The transmission unit 115 is supplied with the segment data from the segment data generation unit 112 and the signaling information from the signaling information generation unit 113. The transmission unit 115 transmits the segment data and the signaling information to at least one of the broadcast server 20 and the communication server 30.

The data providing server 10 is configured as described above.

In FIG. 27, the broadcast server 20 is configured of a reception unit 211, a segment data acquisition unit 212, a signaling template generation unit 213, a differential information generation unit 214, and a transmission unit 215.

The reception unit 211 receives the segment data and the signaling information transmitted from the data providing server 10, and supplies the segment data acquisition unit 212 with the segment data, and the signaling template generation unit 213 and the differential information generation unit 214 with the signaling information.

The segment data acquisition unit 212 acquires and processes the segment data supplied from the reception unit 211, and supplies it to the transmission unit 215.

The signaling template generation unit 213 generates the LLS signaling template (LLS common template) and the SCS signaling template (SCS common template) on the basis of the signaling information supplied from the reception unit 211, and supplies them to the differential information generation unit 214 and the transmission unit 215.

The differential information generation unit 214 generates the LLS signaling instance on the basis of the signaling information supplied from the reception unit 211. The differential information generation unit 214 takes a difference between the LLS signaling template (LLS common template) supplied from the signaling template generation unit 213 and the LLS signaling instance thereby to generate and supply the LLS differential information to the transmission unit 215.

Further, the differential information generation unit 214 generates the SCS-specific template on the basis of the signaling information supplied from the reception unit 211. The differential information generation unit 214 takes a difference between the SCS signaling template (SCS common template) supplied from the signaling template generation unit 213 and the SCS-specific template thereby to generate and supply the SCS template differential information to the transmission unit 215.

Further, the differential information generation unit 214 generates the SCS-specific template and the SCS signaling instance on the basis of the signaling information supplied from the reception unit 211. The differential information generation unit 214 takes a difference between the SCS-specific template and the SCS signaling instance thereby to generate and supply the SCS differential information to the transmission unit 215.

The transmission unit 215 is supplied with the segment data from the segment data acquisition unit 212, the LLS/SCS signaling templates from the signaling template generation unit 213, and the differential information such as LLS/SCS differential information from the differential information generation unit 214. The transmission unit 215 modulates the segment data, the LLS/SCS signaling templates, and the differential information such as LLS/SCS differential information, and transmits them on a digital broadcast signal via an antenna 216.

Additionally, at this time, the segment data of audio or video and the SCS signaling information are transmitted in the FLUTE session in a broadcast wave in digital broadcasting using the IP transmission system.

The broadcast server 20 is configured as described above.

In FIG. 27, the communication server 30 is configured of a reception unit 311, a segment data acquisition unit 312, a signaling template generation unit 313, a differential information generation unit 314, and a communication unit 315.

The reception unit 311 receives the segment data and the signaling information transmitted from the data providing server 10, and supplies the segment data acquisition unit 312 with the segment data, and the signaling template generation unit 313 and the differential information generation unit 314 with the signaling information.

The segment data acquisition unit 312 acquires and processes the segment data supplied from the reception unit 311, and supplies it to the communication unit 315.

The signaling template generation unit 313 generates the LLS signaling template (LLS common template) and the SCS signaling template (SCS common template) on the basis of the signaling information supplied from the reception unit 311, and supplies them to the differential information generation unit 314 and the communication unit 315.

The differential information generation unit 314 generates the LLS signaling instance on the basis of the signaling information supplied from the reception unit 311. The differential information generation unit 314 takes a difference between the LLS signaling template (LLS common template) from the signaling template generation unit 313 and the LLS signaling instance thereby to generate and supply the LLS differential information to the communication unit 315.

Further, the differential information generation unit 314 generates the SCS-specific template on the basis of the signaling information supplied from the reception unit 311. The differential information generation unit 314 takes a difference between the SCS signaling template (SCS common template) from the signaling template generation unit 313 and the SCS-specific template thereby to generate and supply the SCS template differential information to the communication unit 315.

Further, the differential information generation unit 314 generates the SCS-specific template and the SCS signaling instance on the basis of the signaling information supplied from the reception unit 311. The differential information generation unit 314 takes a difference between the SCS-specific template and the SCS signaling instance thereby to generate and supply the SCS differential information to the communication unit 315.

The communication unit 315 is supplied with the segment data from the segment data acquisition unit 312, the LLS/SCS signaling templates from the signaling template generation unit 313, and the differential information such as LLS/SCS differential information from the differential information generation unit 314. The communication unit 315 transmits the segment data, the LLS/SCS signaling templates, or the differential information such as LLS/SCS differential information to the client device 50 via the network 90 in response to a request from the client device 50.

The communication server 30 is configured as described above.

Additionally, in FIG. 26 and FIG. 27, the data providing server 10, the broadcast server 20, and the communication server 30 on the transmission side are described as separate devices for convenience of the description, but the devices on the transmission side may have the functional configurations illustrated in FIG. 27, and for example, the data providing server 10 and the broadcast server 20 or the data providing server 10 and the communication server 30 may be assumed as one device. At this time, for example, the duplicate functions between the reception unit and the transmission unit may be put into one.

Further, for example, the function of providing the segment data and the function of providing the signaling information on the LLS/SCS signaling templates or the differential information such as LLS/SCS differential information are separated in the communication server 30, and the segment data and the signaling information may be provided from different servers. Further, the segment data or the signaling information may be generated in the broadcast server 20 or the communication server 30.

(Exemplary Configuration of Device on Reception Side)

Figure 28:
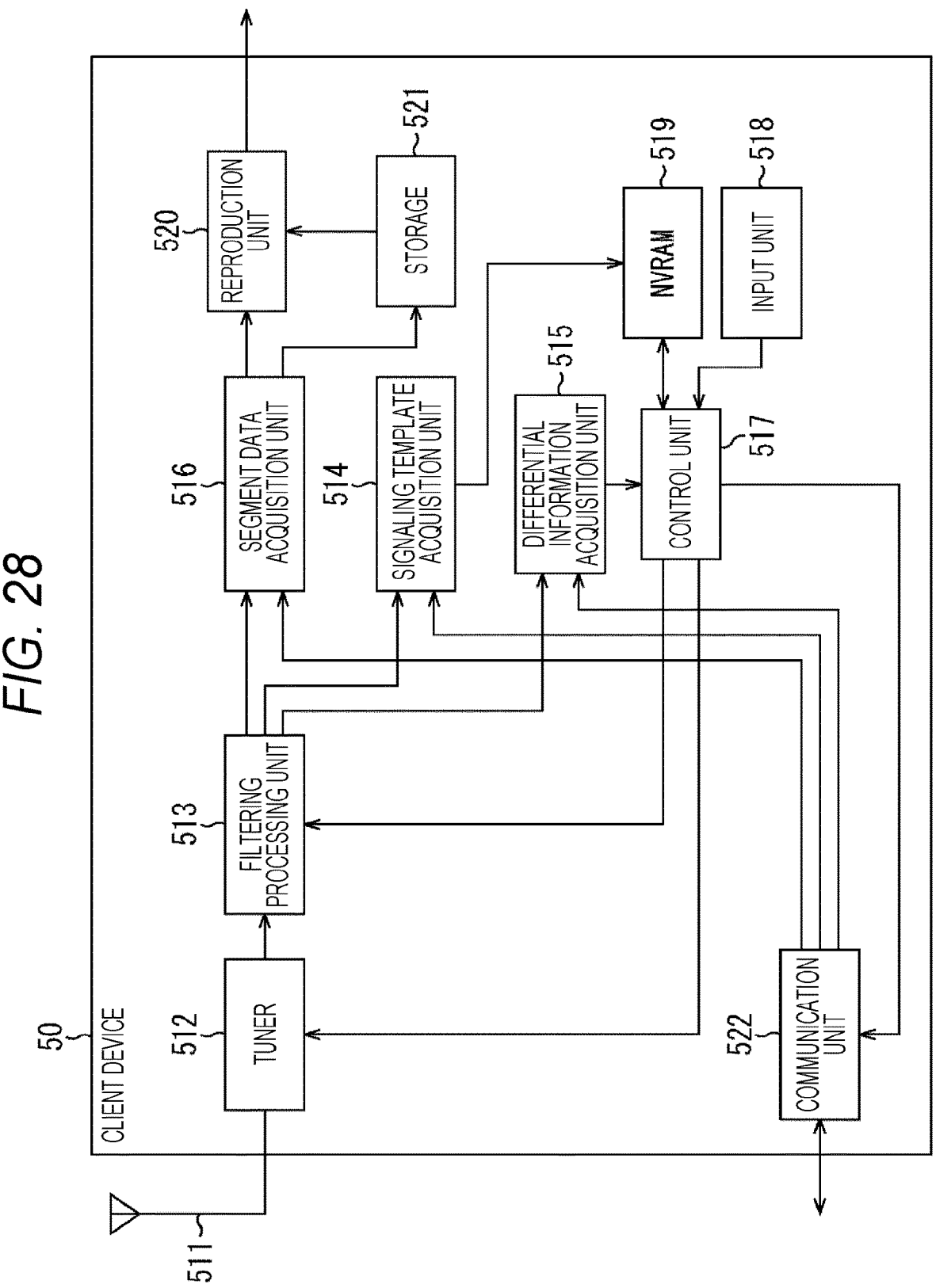
FIG. 28 is a diagram illustrating an exemplary configuration of a client device.

FIG. 28 is a diagram illustrating an exemplary configuration of the client device of FIG. 26.

In FIG. 28, the client device 50 is configured of a tuner 512, a filtering processing unit 513, a signaling template acquisition unit 514, a differential information acquisition unit 515, a segment data acquisition unit 516, a control unit 517, an input unit 518, a NVRAM 519, a reproducing unit 520, a storage 521, and a communication unit 522.

The tuner 512 extracts and demodulates a digital broadcast signal of a tuning-instructed specific service from a broadcast wave of digital broadcasting using the IP transmission system received via an antenna 511, and supplies the resultant BBP stream to the filtering processing unit 513 under control of the control unit 517.

The filtering processing unit 513 performs a filtering processing using IP address, port number, TSI, TOI, or the like on the packets transmitted in the BBP stream supplied from the tuner 512 under control of the control unit 517.

With the filtering processing, the LLS/SCS signaling templates, the differential information such as LLS/SCS differential information, or the segment data of contents is extracted. Then, the LLS/SCS signaling templates are supplied to the signaling template acquisition unit 514, the differential information such as LLS/SCS differential information is supplied to the differential information acquisition unit 515, and the segment data is supplied to the segment data acquisition unit 516.

The signaling template acquisition unit 514 acquires and processes the LLS/SCS signaling templates acquired as a result of the filtering processing by the filtering processing unit 513, or the LLS/SCS signaling templates supplied from the communication unit 522, and records them in the NVRAM 519. For example, the signaling template acquisition unit 514 extracts the LLS/SCS signaling templates stored in SCD, and records them in the NVRAM 519.

The differential information acquisition unit 515 acquires and processes the differential information such as LLS/SCS differential information acquired as a result of the filtering processing by the filtering processing unit 513, or the differential information such as LLS/SCS differential information supplied from the communication unit 522, and supplies it to the control unit 517. Additionally, when the SCS differential information or the SCS template differential information is transmitted in the FLUTE session, the data stored in the LCT packet is analyzed thereby to acquire its differential information.

The control unit 517 controls the operations of each unit in the client device 50 on the basis of the operation signals and the like from the input unit 518. Further, the control unit 517 causes the NVRAM 519 to record various items of information therein.

Further, when a service tuning operation is performed by the user, the control unit 517 reads the tuning information from the NVRAM 512 and controls the tuning processing performed by the tuner 512 on the basis of the tuning information. Additionally, the tuning information is recorded in the NVRAM 519 by an initial scan processing or the like.

The control unit 517 reads the LLS signaling template recorded in the NVRAM 519, and applies the LLS differential information supplied from the differential information acquisition unit 515 to the LLS signaling template thereby to generate the LLS signaling instance (such as SCD).

Further, the control unit 517 reads the SCS signaling template recorded in the NVRAM 519, and applies the SCS template differential information and the SCS differential information supplied from the differential information acquisition unit 515 to the SCS signaling template thereby to generate the SCS signaling instance (such as USD or MPD). The control unit 517 controls the filtering processing performed by the filtering processing unit 513 on the basis of the IP address, the port number, TSI, TOI, or the like corresponding to a specific service acquired as a result of the analysis of the SCS signaling instance. With the filtering processing, the segment data of contents is supplied to the segment data acquisition unit 516.

The segment data acquisition unit 516 acquires and processes the segment data of contents acquired as a result of the filtering processing by the filtering processing unit 513 or the segment data of contents supplied from the communication unit 522, and supplies it to the reproducing unit 520 or the storage 521. Additionally, when the segment data of contents is transmitted in the FLUTE session, the segment data stored in the LCT packet is extracted via connection to the audio or video stream.

The reproducing unit 520 reproduces the audio data obtained from the segment data of contents acquired by the segment data acquisition unit 516 and outputs it to a speaker (not illustrated) under control of the control unit 517. The speaker outputs audio corresponding to the audio data output from the reproducing unit 520.

Further, the reproducing unit 520 reproduces the video data obtained from the segment data of contents acquired by the segment data acquisition unit 516 and outputs it to a display (not illustrated) under control of the control unit 517. The display displays video corresponding to the video data output from the reproducing unit 520.

The storage 521 accumulates therein the audio data and the video data of the contents obtained from the segment data supplied from the segment data acquisition unit 516. The storage 521 supplies the accumulated audio data and video data of the contents in response to a request from the reproducing unit 520. The reproducing unit 520 reproduces the audio data and the video data read from the storage 521.

The communication unit 522 accesses the communication server 30 via the network 90 and requests the signaling information under control of the control unit 517. The communication unit 522 receives the LLS/SCS signaling templates or the differential information such as LLS/SCS differential information transmitted from the communication server 30 via the network 90, supplies the signaling template acquisition unit 514 with the LLS/SCS signaling templates, and supplies the differential information acquisition unit 515 with the differential information such as LLS/SCS differential information.

Further, the communication unit 522 accesses the communication server 30 via the network 90 and requests it to stream the contents under control of the control unit 517. The communication unit 522 receives the segment data of the content stream streamed from the communication server 30 via the network 90, and supplies it to the segment data acquisition unit 516.

Additionally, in the client device 50 of FIG. 28, for example, the tuner 512, the input unit 518, the NVRAM 519, the storage 521, and the communication unit 522 are configured in hardware. Further, in the client device 50, for example, the filtering processing unit 513, the signaling template acquisition unit 514, the differential information acquisition unit 515, the segment data acquisition unit 516, partial function of the control unit 517, and partial function of the reproducing unit 520 are realized in software (such as "middleware" or "DASH client").

Further, the exemplary configuration of the client device 50 in FIG. 28 is such that the speaker or the display is provided outside, but the client device 50 may be configured to have the speaker or the display. In this case, for example, the client device 50 is configured as TV set, and is installed at each home of a user.

(Exemplary Functional Configuration of Control Unit)

Figure 29:
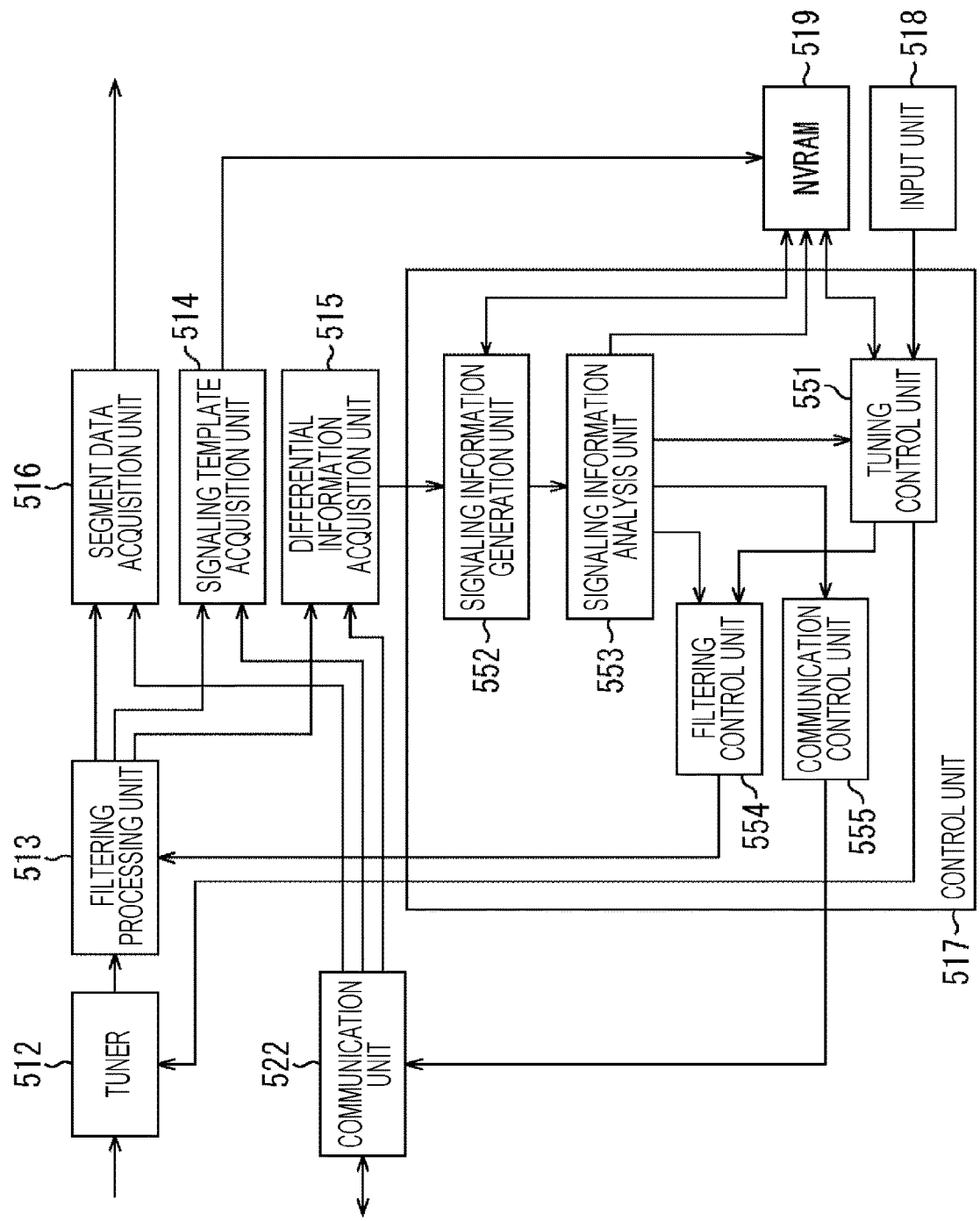
FIG. 29 is a diagram illustrating an exemplary functional configuration of a control unit in the client device.

FIG. 29 is a diagram illustrating an exemplary functional configuration of the part for controlling the tuning processing, the filtering processing, and the communication processing in the control unit 517 of FIG. 28.

In FIG. 29, the control unit 517 is configured of a tuning control unit 551, a signaling information generation unit 552, a signaling information analysis unit 553, a filtering control unit 554, and a communication control unit 555.

The tuning control unit 551 controls the tuning processing performed by the tuner 512. The filtering control unit 554 controls the filtering processing performed by the filtering processing unit 513.

The tuning control unit 551 controls the tuner 512 and the filtering control unit 554 controls the filtering processing unit 513 so that the LLS/SCS signaling templates transmitted as LLS are acquired by the signaling template acquisition unit 514 and recorded in the NVRAM 519. For example, the LLS/SCS signaling templates are stored in SCD, and thus are extracted therefrom.

Further, the LLS differential information transmitted as LLS is acquired by the differential information acquisition unit 515 and is supplied to the signaling information generation unit 552.

The signaling information generation unit 552 reads the LLS signaling template recorded in the NVRAM 519, and applies the LLS differential information supplied from the differential information acquisition unit 515 to the LLS signaling template thereby to generate and supply the LLS signaling instance to the signaling information analysis unit 553. The signaling information analysis unit 553 analyzes the LLS signaling instance supplied from the signaling information generation unit 552, and performs a processing depending on the analysis result.

The tuning control unit 551 acquires the tuning information recorded in the NVRAM 519 during the tuning processing. The tuning control unit 551 controls the tuning processing performed by the tuner 512 on the basis of the acquired tuning information. Further, the tuning control unit 551 supplies the filtering control unit 554 with the SC Bootstrap information of SCD included in the tuning information.

The filtering control unit 554 controls the filtering processing performed by the filtering processing unit 513 on the basis of the SC Bootstrap information supplied from the tuning control unit 551, for example. Thereby, the filtering processing is performed on the LCT packet of SCS by the filtering processing unit 513, and the SCS template differential information or the SCS differential information is acquired by the differential information acquisition unit 515 and supplied to the signaling information generation unit 552.

The signaling information generation unit 552 reads the SCS signaling template (SCS common template) recorded in the NVRAM 519, and applies the SCS template differential information and the SCS differential information supplied from the differential information acquisition unit 515 to the SCS signaling template thereby to generate and supply the SCS signaling instance (such as USD or MPD) to the signaling information analysis unit 553. Additionally, the SCS-specific template which is obtained by applying the SCS template differential information to the SCS common template is recorded in the NVRAM 519.

The signaling information analysis unit 553 analyzes the SCS signaling instance supplied from the signaling information generation unit 552, and supplies the analysis result to the filtering control unit 554 or the communication control unit 555.

That is, when a distribution route of the segment data of contents of interest is in broadcasting, the signaling information analysis unit 553 specifies the IP address, the port number, TSI, and TOI for connecting to the content stream and supplies them to the filtering control unit 554. Further, when a distribution route of the segment data is in communication, the signaling information analysis unit 553 supplies the information on acquisition destination (such as URL) to the communication control unit 555.

The filtering control unit 554 controls the filtering processing performed by the filtering processing unit 513 on the basis of the IP address, the port number, TSI, and TOI supplied from the signaling information analysis unit 553. Thereby, the filtering processing is performed on the LCT packet of the segment data by the filtering processing unit 513, and the resultant segment data of contents is supplied to the segment data acquisition unit 516.

The communication control unit 555 controls the communication processing performed by the communication unit 522 on the basis of the information on acquisition destination (such as URL) supplied from the signaling information analysis unit 553. Thereby, the segment data of contents streamed from the communication server 30 via the network 90 is received by the communication unit 522 and supplied to the segment data acquisition unit 516.

The detailed configurations of the respective devices configuring the broadcast communication system 1 of FIG. 26 have been described above.

<4. Flow of Processing in Respective Devices>

A flow of the processing performed by the respective devices configuring the broadcast communication system 1 of FIG. 26 will be described below with reference to the flowcharts of FIG. 30 to FIG. 32.

(Signaling Information Distribution Processing Using LLS/SCS Signaling Templates)

A flow of the signaling information distribution processing using the LLS/SCS signaling templates performed by the respective devices configuring the broadcast communication system 1 of FIG. 26 will be first described with reference to the flowcharts of FIG. 30 and FIG. 31.

Figure 30:
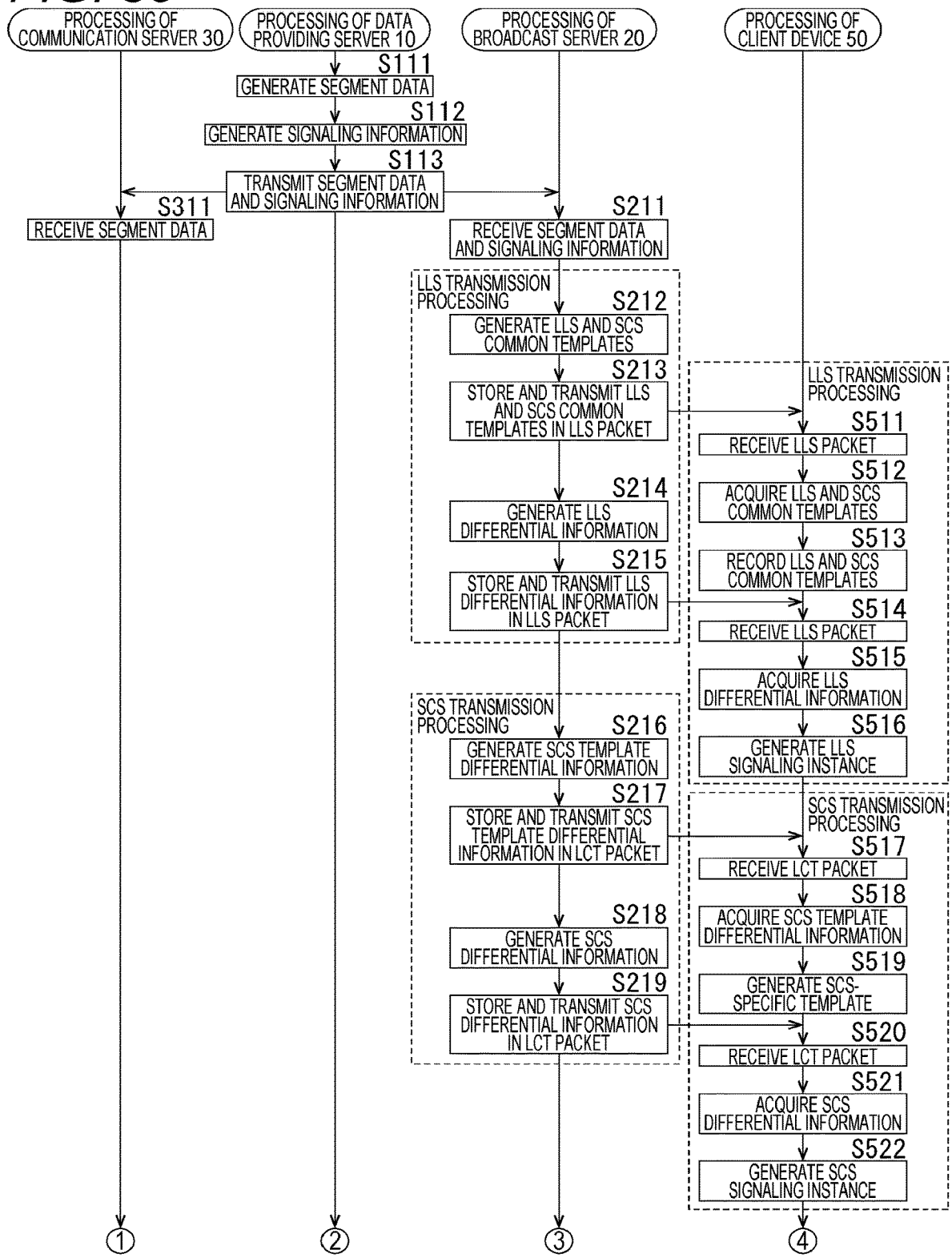
FIG. 30 is a flowchart for explaining a flow of a signaling information distribution processing using the LLS/SCS signaling templates.
Figure 31:
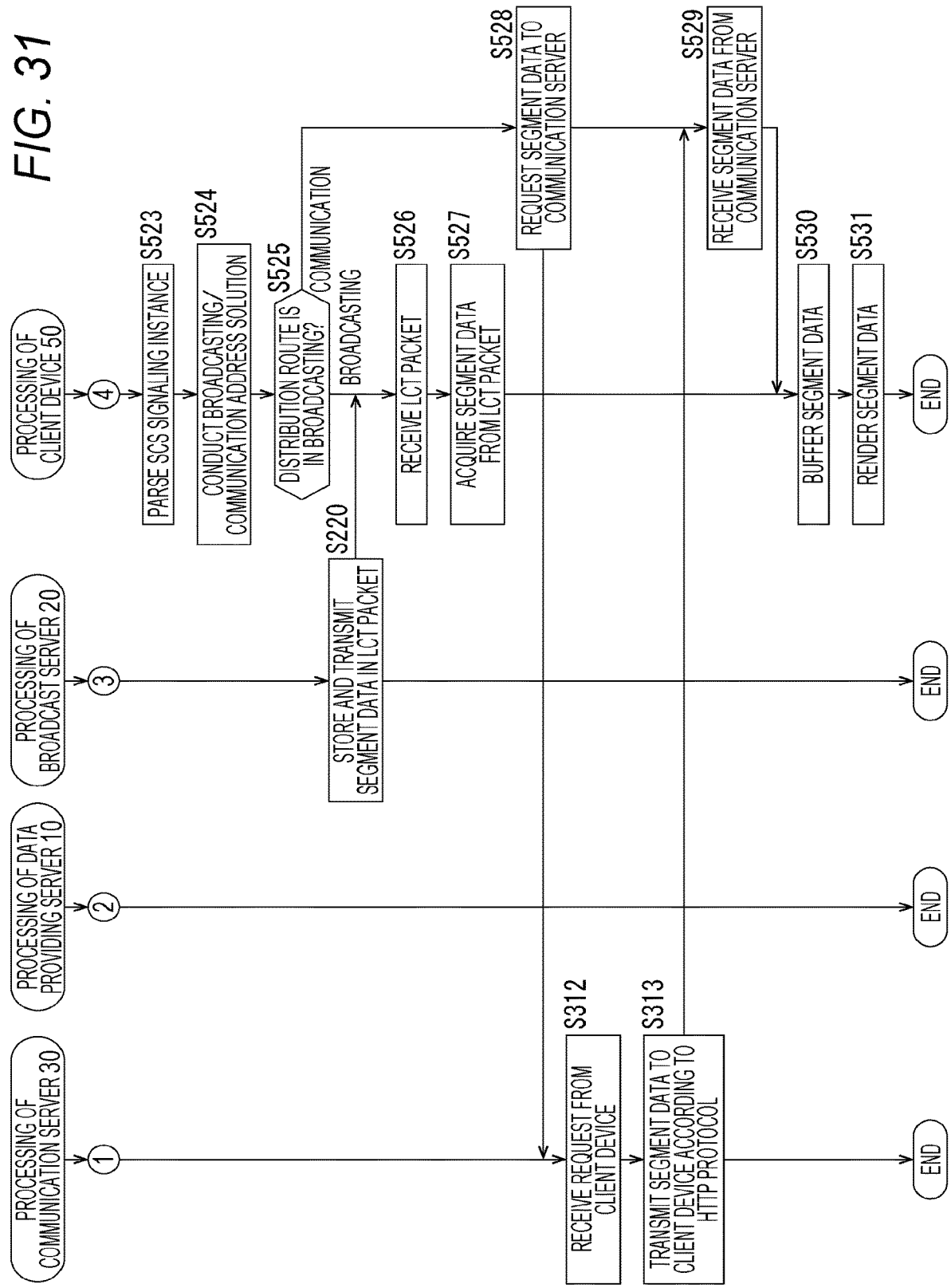
FIG. 31 is a flowchart for explaining a flow of the signaling information distribution processing using the LLS/SCS signaling templates.

In FIG. 30 and FIG. 31, a flow of the processing of the data providing server 10, the broadcast server 20, and the communication server 30 as devices on the transmission side is illustrated and a flow of the processing of the client device 50 as device on the reception side is illustrated.

The data providing server 10 performs a series of processing in steps S111 to S113 in FIG. 30. Specifically, in step S111, the segment data generation unit 112 generates the segment data on the basis of the stream data of contents accumulated in the content accumulation unit 111.

In step S112, the signaling information generation unit 113 generates the signaling information on the basis of the content metadata accumulated in the content accumulation unit 111 and the signaling-associated information for generating the signaling information accumulated in the signaling-associated information accumulation unit 114.

In step S113, the transmission unit 115 transmits the segment data generated in the processing in step S111 and the signaling information generated in the processing in step S112 to the broadcast server 20. Further, the transmission unit 115 transmits the segment data generated in the processing in step S111 to the communication server 30.

The broadcast server 20 performs a series of processing in steps S211 to S219 in FIG. 30 and the processing in step S220 in FIG. 31. Specifically, in step S211, the reception unit 211 receives the segment data and the signaling information transmitted from the data providing server 10, and supplies the segment data acquisition unit 212 with the segment data, and the signaling template generation unit 213 and the differential information generation unit 214 with the signaling information, respectively.

In step S212, the signaling template generation unit 213 generates the LLS signaling template (LLS common template) and the SCS signaling template (SCS common template) on the basis of the signaling information received in the processing in step S211.

In step S213, the transmission unit 215 stores the LLS common template and the SCS common template generated in the processing in step S212 in the LLS packet, and transmits the LLS packet on a digital broadcast signal via the antenna 216.

In step S214, the differential information generation unit 214 generates the LLS signaling instance on the basis of the signaling information received in the processing in step S211. Further, the differential information generation unit 214 takes a difference between the LLS signaling template (LLS common template) generated in the processing in step S212 and the LLS signaling instance thereby to generate the LLS differential information.

In step S215, the transmission unit 215 stores the LLS differential information generated in the processing in step S214 in the LLS packet, and transmits the LLS packet on a digital broadcast signal via the antenna 216. Additionally, in a series of processing in steps S212 to S215, the LLS/SCS signaling templates and the LLS differential information are stored in the LLS packet and transmitted in LLS, and thus the fact may be a "LLS transmission processing."

In step S216, the differential information generation unit 214 generates the SCS-specific template on the basis of the signaling information received in the processing in step S211. Further, the differential information generation unit 214 takes a difference between the SCS signaling template (SCS common template) generated in the processing in step S212 and the SCS-specific template thereby to generate the SCS template differential information.

In step S217, the transmission unit 215 stores the SCS template differential information generated in the processing in step S216 in the LCT packet, and transmits the LCT packet on a digital broadcast signal via the antenna 216.

In step S218, the differential information generation unit 214 generates the SCS-specific template and the SCS signaling instance on the basis of the signaling information received in the processing in step S211. Further, the differential information generation unit 214 takes a difference between the SCS-specific template and the SCS signaling instance thereby to generate the SCS differential information.

In step S219, the transmission unit 215 stores the SCS differential information generated in the processing in step S218 in the LCT packet, and transmits the LCT packet on a digital broadcast signal via the antenna 216. Additionally, in a series of processing in steps S216 to S219, the SCS template differential information and the SCS differential information are stored in the LCT packet and transmitted in the FLUTE session by SCS, and thus the fact may be a "SCS transmission processing."

In step S220, the segment data acquisition unit 212 acquires and processes the segment data received in the processing in step S211. The transmission unit 215 stores the segment data processed by the segment data acquisition unit 212 in the LCT packet, and transmits the LCT packet on a digital broadcast signal via the antenna 216.

The communication server 30 performs the processing in step S311 in FIG. 30 and a series of processing in steps S312 to 313 in FIG. 31. Specifically, in step S311, the reception unit 311 receives the segment data transmitted from the data providing server 10, and supplies it to the segment data acquisition unit 312.

In step S312, the communication unit 315 receives a segment data request transmitted from the client device 50 via the network 90. In step S313, the communication unit 315 transmits the segment data received in the processing in step S311 to the client device 50 via the network 90 according to the HTTP protocol in response to the request from the client device 50 received in the processing in step S312.

The client device 50 performs a series of processing in steps S511 to S522 in FIG. 30 and steps S523 to S531 in FIG. 31. Specifically, the LLS packet transmitted as digital broadcast signal from the broadcast server 20 is received by the client device 50 (S511). The filtering processing unit 513 then performs the filtering processing on the LLS packet under control of the filtering control unit 554.

In step S512, the signaling template acquisition unit 514 acquires the LLS signaling template (LLS common template) and the SCS signaling template (SCS common template) obtained as a result of the filtering processing by the filtering processing unit 513. In step S513, the signaling template acquisition unit 514 records the LLS common template and the SCS common template acquired in the processing in step S512 in the NVRAM 519.

Further, the LLS packet transmitted as digital broadcast signal from the broadcast server 20 is received by the client device 50 (S514). The filtering processing unit 513 then performs the filtering processing on the LLS packet under control of the filtering control unit 554.

In step S515, the differential information acquisition unit 515 acquires the LLS differential information obtained as a result of the filtering processing by the filtering processing unit 513.

In step S516, the signaling information generation unit 552 reads the LLS common template recorded in the NVRAM 519 in the processing in step S513, and applies the LLS differential information acquired in the processing in step S515 to the LLS common template thereby to generate the LLS signaling instance.

Additionally, in a series of processing in steps S511 to S516, the LLS/SCS signaling templates and the LLS differential information stored in the LLS packet transmitted in LLS are acquired thereby to generate the LLS signaling instance, and thus the fact may be a "LLS transmission processing."

Further, the LCT packet transmitted as digital broadcast signal from the broadcast server 20 is received by the client device 50 (S517). The filtering processing unit 513 then performs the filtering processing on the LCT packet under control of the filtering control unit 554.

In step S518, the differential information acquisition unit 515 acquires the SCS template differential information obtained as a result of the filtering processing by the filtering processing unit 513.

In step S519, the signaling information generation unit 552 reads the SCS common template recorded in the NVRAM 519 in the processing in step S513, and applies the SCS template differential information acquired in the processing in step S518 to the SCS common template thereby to generate the SCS-specific template. The SCS-specific template is recorded as SCS signaling template in the NVRAM 519.

Further, the LCT packet transmitted as digital broadcast signal from the broadcast server 20 is received by the client device by the client device 50 (S520). The filtering processing unit 513 then performs the filtering processing on the LCT packet under control of the filtering control unit 554.

In step S521, the differential information acquisition unit 515 acquires the SCS differential information obtained as a result of the filtering processing by the filtering processing unit 513.

In step S522, the signaling information generation unit 552 reads the SCS-specific template recorded in the NVRAM 519 in the processing in step S519, and applies the SCS differential information acquired in the processing in step S521 to the SCS-specific template thereby to generate the SCS signaling instance.

Additionally, in a series of processing in steps S517 to S522, the SCS template differential information and the SCS differential information stored in the LCT packet transmitted in SCS are acquired thereby to generate the SCS signaling instance, and thus the fact may be a "SCS transmission processing."

In step S523, the signaling information analysis unit 553 parses (analyzes) the SCS signaling instance (such as USD or MPD) generated in the processing in step S522.

In step S524, the signaling information analysis unit 553 conducts broadcasting/communication address solution according to the parsing result in the processing in step S523, and performs a determination processing on whether a distribution route of the content stream is in broadcasting or communication (S525). Herein, the information for identifying a stream distribution route is designated for the DeliveryMethod element in USD, and thus the address solution can be conducted with reference to USD as to whether the content stream listed in the AdaptationSet element (Representation element) in MPD is transmitted in broadcasting or communication.

In step S525, when it is determined that a distribution route of the content stream is in broadcasting, the processing proceeds to step S526. In step S526, the LCT packet transmitted as digital broadcast signal from the broadcast server 20 is received.

The filtering processing unit 513 then performs the filtering processing on the LCT packet under control of the filtering control unit 554. With the filtering processing, the segment data stored in the LCT packet is extracted and acquired by the segment data acquisition unit 516 (S527).

On the other hand, in step S525, when it is determined that a distribution route of the content stream is in communication, the processing proceeds to step S528. In step S528, the communication unit 522 accesses the communication server 30 via the network 90 and requests it to stream the contents under control of the communication control unit 555.

In step S529, the communication unit 522 receives the segment data of the content stream streamed from the communication server 30 under control of the communication control unit 555. The segment data is acquired by the segment data acquisition unit 516.

When the segment data is acquired in the processing in step S527 or step S529, the processing proceeds to step S530.

The reproducing unit 520 then buffers (S530) and further renders (S531) the segment data supplied from the segment data acquisition unit 515. Thereby, the contents distributed from the broadcast server 20 or the communication server 30 are reproduced in the client device 50.

The signaling information distribution processing using the LLS/SCS signaling templates has been described above. In the signaling information distribution processing using the LLS/SCS signaling templates, continuously-available information is earlier distributed as LLS/SCS signaling template, and then the LLS/SCS differential information is distributed.

Thereby, the LLS/SCS differential information is applied to the earlier-acquired LLS/SCS signaling templates thereby to generate the LLS/SCS signaling instances in the client device 50. The content reception/reproduction processing is then performed on the basis of the generated LLS/SCS signaling instances in the client device 50.

At this time, the LLS/SCS differential information distributed from the broadcast server 20 to the client device 50 is smaller in data size than the LLS/SCS signaling instances (LLS/SCS signaling information), and thus even the signaling information in the text format such as XML document can be efficiently distributed. In particular, an XML document has many fixed character strings such as statements, and thus it is effective to distribute not the full text but only the difference.

Additionally, the description has been made in FIG. 30 and FIG. 31 assuming that the client device 50 has the functional configuration illustrated in FIG. 28 and FIG. 29 and the components perform the processing, but actually the middleware or DASH client performs each processing performed by the client device 50. Further, the processing performed by the broadcast server 20 and the communication server 30 is actually performed in middleware.

Further, for a timing to apply the LLS/SCS differential information to the LLS/SCS signaling templates, for example, the version information included in the LLS/SCS signaling template identifiers or the LLS/SCS signaling instance identifiers is monitored so that when the version information is updated, the LLS/SCS differential information can be applied, or when an expiration is designated, the LLS/SCS differential information can be acquired and applied when the expiration passes. However, the timing to apply the LLS/SCS differential information illustrated herein is exemplary, and the LLS/SCS differential information may be applied at other timing.

Further, the description has been made in FIG. 30 and FIG. 31 assuming that the broadcast server 20 provides the signaling information such LLS/SCS signaling templates or LLS/SCS differential information, but the signaling information may be provided by the communication server 30 via the network 90.

(Signaling Information Distribution Processing for Service-Based SCS Signaling Information)

A flow of the signaling information distribution processing for service-based SCS signaling information performed by the respective devices configuring the broadcast communication system 1 of FIG. 26 will be described below with reference to the flowchart of FIG. 32.

Figure 32:
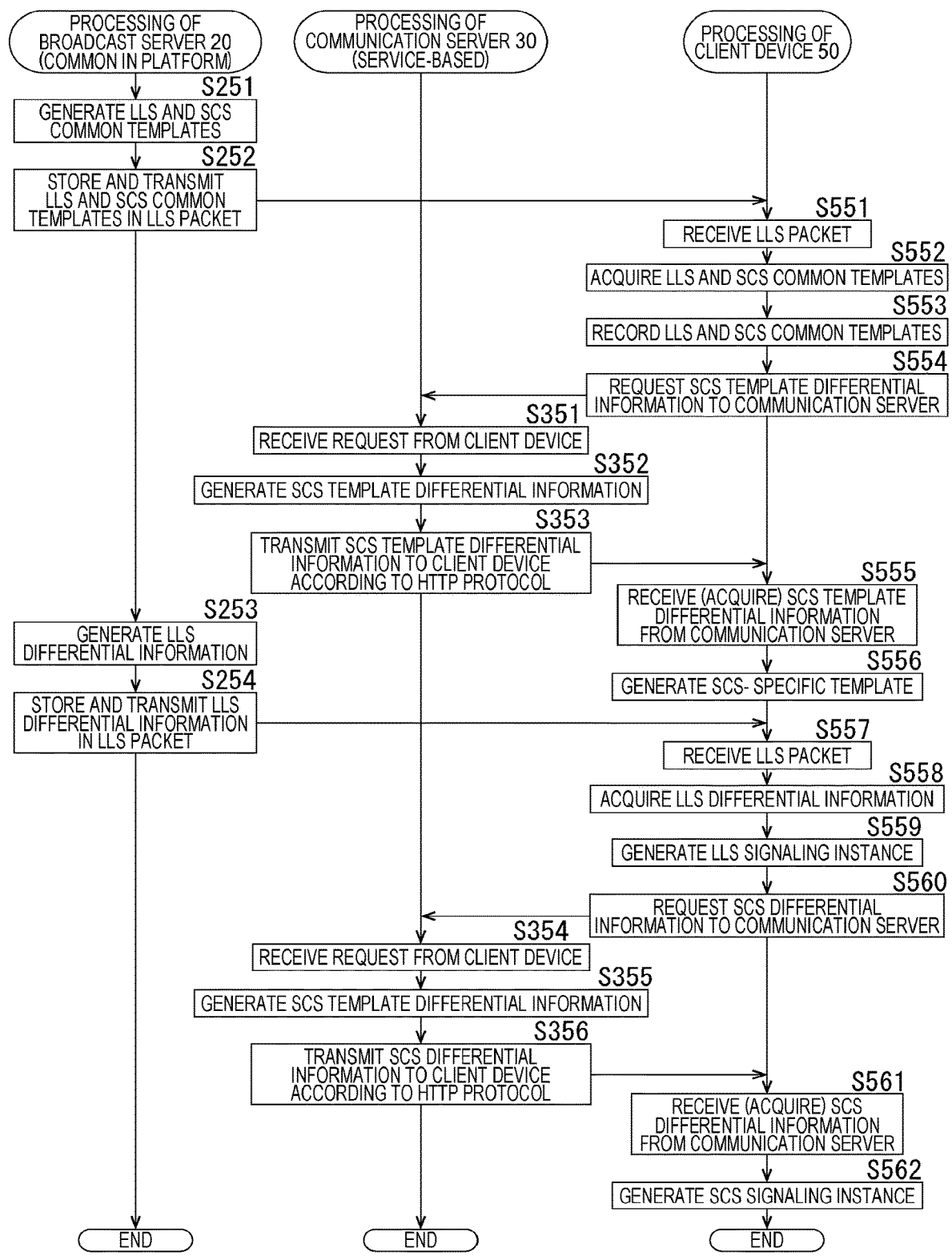
FIG. 32 is a flowchart for explaining a flow of the signaling information distribution processing for service-based SCS signaling information.

FIG. 32 illustrates a flow of the processing of the broadcast server 20 and the communication server 30 as devices on the transmission side and a flow of the processing of the client device 50 as device on the reception side. Additionally, a flow of the processing of the data providing server 10 is omitted, but the signaling information generated by the data providing server 10 is assumed to be provided to the broadcast server 20 and the communication server 30. Further, the broadcast server 20 and the communication server 30 are assumed to share the information on the LLS/SCS signaling templates.

Further, the description will be made in FIG. 32 assuming that the broadcast server 20 managed by a standardization organization such as ATSC distributes the signaling information common in platform and the communication server 30 managed by each broadcast station distributes the service-based signaling information.

The broadcast server 20 performs a series of processing in step S251 to S254 in FIG. 32. Specifically, in step S251, the signaling template generation unit 213 generates the LLS signaling template (LLS common template) and the SCS signaling template (SCS common template) on the basis of the signaling information acquired from the data providing server 10.

In step S252, the transmission unit 215 stores the LLS common template and the SCS common template generated in the processing in step S251 in the LLS packet, and transmits the LLS packet on a digital broadcast signal via the antenna 216.

In step S253, the differential information generation unit 214 generates the LLS signaling instance on the basis of the signaling information acquired from the data providing server 10. Further, the differential information generation unit 214 takes a difference between the LLS signaling template (LLS common template) generated in the processing in step S251 and the LLS signaling instance thereby to generate the LLS differential information.

In step S254, the transmission unit 215 stores the LLS differential information generated in the processing in step S253 in the LLS packet, and transmits the LLS packet on a digital broadcast signal via the antenna 216.

The communication server 30 performs a series of processing in steps S351 to S356 in FIG. 32. Specifically, in step S351, the communication unit 315 receives a SCS template differential information request transmitted from the client device 50 via the network 90.

In step S352, the differential information generation unit 314 generates the service-based SCS-specific template on the basis of the signaling information acquired from the data providing server 10. The differential information generation unit 314 takes a difference between the SCS signaling template (SCS common template) generated in step S251 and the SCS-specific template thereby to generate the SCS template differential information.

In step S353, the communication unit 315 transmits the SCS template differential information generated in the processing in step S352 to the client device 50 via the network 90 according to the HTTP protocol in response to the request from the client device 50 received in the processing in step S351.

In step S354, the communication unit 315 receives the SCS differential information request transmitted from the client device 50 via the network 90.

In step S355, the differential information generation unit 314 generates the service-based SCS-specific template and the SCS signaling instance on the basis of the signaling information acquired from the data providing server 10. The differential information generation unit 314 takes a difference between the SCS-specific template and the SCS signaling instance thereby to generate the SCS differential information.

In step S356, the communication unit 315 transmits the SCS differential information generated in the processing in step S355 to the client device 50 via the network 90 according to the HTTP protocol in response to the request from the client device 50 received in the processing in step S354.

The client device 50 performs a series of processing in steps S551 to S562 in FIG. 32. Specifically, the LLS packet transmitted as digital broadcast signal from the broadcast server 20 is received by the client device 50 (S551). The filtering processing unit 513 then performs the filtering processing on the LLS packet under control of the filtering control unit 554.

In step S552, the signaling template acquisition unit 514 acquires the LLS signaling template (LLS common template) and the SCS signaling template (SCS common template) acquired as a result of the filtering processing by the filtering processing unit 513. In step S553, the signaling template acquisition unit 514 records the LLS common template and the SCS common template in the NVRAM 519.

In step S554, the communication unit 522 accesses the communication server 30 via the network 90 thereby to request the SCS template differential information under control of the communication control unit 555. In step S555, the communication unit 522 receives the SCS template differential information distributed from the communication server 30 under control of the communication control unit 555. The SCS template differential information is acquired by the differential information acquisition unit 515.

In step S556, the signaling information generation unit 552 reads the SCS common template recorded in the NVRAM 519 in the processing in step S553, and applies the SCS template differential information acquired in the processing in step S555 to the SCS common template thereby to generate the SCS-specific template. The SCS-specific template is recorded as SCS signaling template in the NVRAM 519.

Further, the LLS packet transmitted as digital broadcast signal from the broadcast server 20 is received by the client device 50 (S557). The filtering processing unit 513 then performs the filtering processing on the LLS packet under control of the filtering control unit 554.

In step S558, the differential information acquisition unit 515 acquires the LLS differential information acquired as a result of the filtering processing by the filtering processing unit 513.

In step S559, the signaling information generation unit 552 reads the LLS common template recorded in the NVRAM 519 in the processing in step S553, and applies the LLS differential information acquired in the processing in step S558 to the LLS common template thereby to generate the LLS signaling instance.

In step S560, the communication unit 522 accesses the communication server 30 via the network 90 thereby to request the SCS differential information under control of the communication control unit 555. In step S561, the communication unit 522 receives the SCS differential information distributed from the communication server 30 under control of the communication control unit 555. The SCS differential information is acquired by the differential information acquisition unit 515.

In step S562, the signaling information generation unit 552 reads the SCS-specific template recorded in the NVRAM 519 in the processing in step S556, and applies the SCS differential information acquired in the processing in step S561 to the SCS-specific template thereby to generate the SCS signaling instance.

In this way, the LLS signaling instance (such as SCD) is generated in the processing in step S559 and the SCS signaling instance (such as USD or MPD) is generated in the processing in step S562 so that the stream data of contents is acquired and reproduced by use of the signaling information.

The signaling information distribution processing for service-based SCS signaling information has been described above. In the signaling information distribution processing for service-based SCS signaling information, for example, the broadcast server 20 managed by a standardization organization such as ATSC can distribute the signaling information common in platform such as LLS/SCS signaling instances or LLS differential information, and the communication server 30 managed by each broadcast station can flexibly cope with various operation forms such as distributing service-based signaling information such as SCS template differential information or SCS differential information.

<5. Configuration of Computer>

A series of processing described above can be performed in hardware or in software. When the series of processing is performed in software, the programs configuring the software are installed in a computer. FIG. 33 is a diagram illustrating an exemplary hardware configuration of the computer performing the series of processing by the programs.

In a computer 900, a central processing unit (CPU) 901, a read only memory (ROM) 902, and a random access memory (RAM) 903 are mutually connected via a bus 904. The bus 904 is further connected with an I/O interface 905. The I/O interface 905 is connected with an input unit 906, an output unit 907, a recording unit 908, a communication unit 909, and a drive 910.

The input unit 906 is configured of a keyboard, mouse, microphone, or the like. The output unit 907 is configured of a display, speaker, or the like. The recording unit 908 is configured of a hard disc, nonvolatile memory, or the like. The communication unit 909 is configured of a network interface or the like. The drive 910 drives a removable medium 911 such as magnetic disc, optical disc, magnetooptical disc, or semiconductor memory.

In the thus-configured computer 900, the CPU 901 loads and executes the programs stored in the ROM 902 or the recording unit 908 into the RAM 903 via the I/O interface 905 and the bus 904 so that the series of processing is performed.

The programs executed by the computer 900 (the CPU 901) can be recorded in the removable medium 911 as package medium to be provided, for example. Further, the programs can be provided via a wired or wireless transmission medium such as local area network, Internet or digital satellite broadcasting.

In the computer 900, the removable medium 911 is mounted on the drive 910 so that the programs can be installed in the recording unit 908 via the I/O interface 905. Further, the programs can be received by the communication unit 909 and installed in the recording unit 908 via a wired or wireless transmission medium. Additionally, the programs can be previously installed in the ROM 902 or the recording unit 908.

Herein, in the specification, the processing performed by the computer according to the programs does not necessarily need to be performed in time series in the order described in the flowcharts. That is, the processing performed by the computer according to the programs includes the processing performed in parallel or independently (such as parallel processing or processing by objects). Further, the programs may be processed by one computer (processor) or may be distributed and processed in a plurality of computers.

The exemplary embodiment of the present technology is not limited to the above exemplary embodiment, and can be variously changed within the scope without departing from the spirit of the present technology.

The present technology may employ the following configurations.

(1)

A reception device including:

a signaling template acquisition unit for acquiring a first signaling template in order to generate first signaling information transmitted in a first hierarchy lower than an Internet protocol (IP) layer in the protocol hierarchies in an IP transmission system, and a second signaling template in order to generate second signaling information transmitted in a second hierarchy higher than the IP layer;

a differential information acquisition unit for acquiring first differential information applied to the first signaling template to generate the first signaling information, and second differential information applied to the second signaling template to generate the second signaling information; and a signaling information generation unit for applying the first differential information to the first signaling template thereby to generate the first signaling information, and applying the second differential information to the second signaling template thereby to generate the second signaling information.

(2)

The reception device according to (1), wherein the first signaling template, the second signaling template, and the first differential information are transmitted in the first hierarchy, the second differential information is transmitted in the second hierarchy, the signaling template acquisition unit acquires the first signaling template and the second signaling template transmitted in the first hierarchy, and the differential information acquisition unit acquires the first differential information transmitted in the first hierarchy and the second differential information transmitted in the second hierarchy.

(3)

The reception device according to (1) or (2), wherein the first signaling information includes a parameter not depending on a service identified by an IP address, and the second signaling information includes a parameter depending on the service.

(4)

The reception device according to (3), wherein the differential information acquisition unit acquires third differential information applied to the second signaling template to generate the service-based second signaling template, which is transmitted in the second hierarchy, and the service-based second signaling template is generated by applying the third differential information to the second signaling template.

(5)

The reception device according to any of (1) to (4), wherein the first signaling template and the second signaling template are stored in the first signaling information.

(6)

The reception device according to any of (1) to (4), wherein information on reference destinations of the first signaling template and the second signaling template is stored in the first signaling information.

(7)

The reception device according to any of (1) to (6), further including:

a recording unit for recording the first signaling template and the second signaling template therein.

(8)

A reception method for a reception device, wherein the reception device acquires a first signaling template for generating first signaling information transmitted in a first hierarchy lower than an IP layer in the protocol hierarchies in an IP transmission system, and a second signaling template for generating second signaling information transmitted in a second hierarchy higher than the IP layer, acquires first differential information applied to the first signaling template to generate the first signaling information, and second differential information applied to the second signaling template to generate the second signaling information, and applies the first differential information to the first signaling template thereby to generate the first signaling information, and applies the second differential information to the second signaling template thereby to generate the second signaling information.

(9)

A transmission device including:

a signaling template generation unit for generating a first signaling template in order to generate first signaling information transmitted in a first hierarchy lower than an IP layer in the protocol hierarchies in an IP transmission system, and a second signaling template in order to generate second signaling information transmitted in a second hierarchy higher than the IP layer;

a differential information generation unit for generating first differential information applied to the first signaling template to generate the first signaling information, and second differential information applied to the second signaling template to generate the second signaling information; and a transmission unit for transmitting the first signaling template, the second signaling template, the first differential information, or the second differential information.

(10)

The transmission device according to (9), wherein the first signaling template, the second signaling template, and the first differential information are transmitted in the first hierarchy, and the second differential information is transmitted in the second hierarchy.

(11)

The transmission device according to (9) or (10), wherein the first signaling information includes a parameter not depending on a service identified by an IP address, and the second signaling information includes a parameter depending on the service.

(12)

The transmission device according to (11), wherein the differential information generation unit generates third differential information applied to the second signaling template to generate the service-based second signaling template, and the transmission unit transmits the third differential information in the second hierarchy.

(13)

The transmission device according to any of (9) to (12), wherein the first signaling template and the second signaling template are stored in the first signaling information.

(14)

The transmission device according to any of (9) to (12), wherein information on reference destinations of the first signaling template and the second signaling template is stored in the first signaling information.

(15)

A transmission method for a transmission device, wherein the transmission device generates a first signaling template for generating first signaling information transmitted in a first hierarchy lower than an IP layer in the protocol hierarchies in an IP transmission system, and a second signaling template for generating second signaling information transmitted in a second hierarchy higher than the IP layer, generates first differential information applied to the first signaling template to generate the first signaling information, and second differential information applied to the second signaling template to generate the second signaling information, and transmits the first signaling template, the second signaling template, the first differential information, or the second differential information.

REFERENCE SIGNS LIST

1 Broadcast communication system
10 Data providing server
20 Broadcast server
30 Communication server
50 Client device
90 Network
211 Reception unit
212 Segment data acquisition unit
213 Signaling template generation unit
214 Differential information generation unit
215 Transmission unit
311 Reception unit
312 Segment data acquisition unit
313 Signaling template generation unit
314 Differential information generation unit
315 Communication unit
512 Tuner
513 Filtering processing unit
514 Signaling template acquisition unit
515 Differential information acquisition unit
516 Segment data acquisition unit
517 Control unit
518 Input unit 519 NVRAM
520 Reproduction unit
521 Storage
522 Communication unit
551 Tuning control unit
552 Signaling information generation unit
553 Signaling information analysis unit
554 Filtering control unit
555 Communication control unit
900 Computer
901 CPU

The invention claimed is:

1. A reception device comprising:
processing circuitry configured to
receive a first signaling template associated with a first identifier and first signaling information transmitted in a first layer of an Internet protocol (IP) transmission system in a digital broadcast signal, and a second signaling template associated with a second identifier and second signaling information transmitted in a second layer of the IP transmission system in the digital broadcast signal, the second layer being different from the first layer;
receive first differential information associated with the first identifier and to be applied to the first signaling template to generate the first signaling information, and second differential information associated with the second identifier and to be applied to the second signaling template to generate the second signaling information; and
apply the first differential information to the first signaling template based on the first identifier to generate the first signaling information, and apply the second differential information to the second signaling template based on the second identifier to generate the second signaling information.

2. The reception device according to claim 1, wherein
the first signaling template, the second signaling template, and the first differential information are transmitted in the first layer,
the second differential information is transmitted in the second layer, and
the processing circuitry is configured to
acquire the first signaling template and the second signaling template transmitted in the first layer, and
acquire the first differential information transmitted in the first layer and the second differential information transmitted in the second layer.

3. The reception device according to claim 2, wherein
the first signaling information includes a parameter not depending on a service identified by an IP address, and
the second signaling information includes a parameter depending on the service.

4. The reception device according to claim 3, wherein
the processing circuitry is configured to acquire third differential information applied to the second signaling template to generate a service-based second signaling template, which is transmitted in the second layer, and
the service-based second signaling template is generated by applying the third differential information to the second signaling template.

5. The reception device according to claim 4, wherein the first signaling template and the second signaling template are stored in the first signaling information.

6. The reception device according to claim 4, wherein information on reference destinations of the first signaling template and the second signaling template is stored in the first signaling information.

7. The reception device according to claim 1, further comprising:
a memory configured to store the first signaling template and the second signaling template therein.

8. The reception device according to claim 1, wherein the processing circuitry is configured to receive the first signaling template and the second signaling template from a server.

9. The reception device according to claim 1, wherein
the first layer is lower than an IP layer in protocol layers of the IP transmission system, and
the second layer is higher than the IP layer.

10. A reception method for a reception device, the method comprising:
receiving a first signaling template associated with a first identifier and first signaling information transmitted in a first layer of an Internet protocol (IP) transmission system in a digital broadcast signal, and a second signaling template associated with a second identifier and second signaling information transmitted in a second layer of the IP transmission system in the digital broadcast signal, the second layer being different from the first layer,
receiving first differential information associated with the first identifier and to be applied to the first signaling template to generate the first signaling information, and second differential information associated with the second identifier and to be applied to the second signaling template to generate the second signaling information; and
applying the first differential information to the first signaling template based on the first identifier to generate the first signaling information, and applying the second differential information to the second signaling template based on the second identifier to generate the second signaling information.

* * * * *